United States Patent
Tadokoro et al.

(10) Patent No.: US 12,467,742 B2
(45) Date of Patent: Nov. 11, 2025

(54) FILM THICKNESS ANALYSIS METHOD, FILM THICKNESS ANALYSIS DEVICE AND STORAGE MEDIUM

(71) Applicant: Tokyo Electron Limited, Tokyo (JP)

(72) Inventors: Masahide Tadokoro, Kumamoto (JP); Toyohisa Tsuruda, Kumamoto (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 168 days.

(21) Appl. No.: 18/275,499

(22) PCT Filed: Jan. 28, 2022

(86) PCT No.: PCT/JP2022/003352
§ 371 (c)(1),
(2) Date: Aug. 2, 2023

(87) PCT Pub. No.: WO2022/168756
PCT Pub. Date: Aug. 11, 2022

(65) Prior Publication Data
US 2025/0076028 A1 Mar. 6, 2025

(30) Foreign Application Priority Data

Feb. 3, 2021 (JP) .............................. 2021-015734
Jan. 24, 2022 (JP) .............................. 2022-008452

(51) Int. Cl.
*G01B 11/06* (2006.01)

(52) U.S. Cl.
CPC .............................. *G01B 11/0625* (2013.01)

(58) Field of Classification Search
CPC ...... G01B 11/0625; G01B 11/06; B05D 1/40; H01L 21/027; G03F 7/162
See application file for complete search history.

(56) References Cited

U.S. PATENT DOCUMENTS

| 6,798,513 B2 * | 9/2004 | Abraham | G01F 23/284 356/369 |
| 2018/0342410 A1 * | 11/2018 | Hooge | H01L 21/67115 |

FOREIGN PATENT DOCUMENTS

| JP | 2003-093959 A | 4/2003 |
| JP | 2016-147246 A | 8/2016 |

(Continued)

OTHER PUBLICATIONS

Yiin Kuen Fuh, "Effect of rotationally moving surface on roughness measurement of sputtered Pt film with close-loop correction using adaptive optics", 2016 (Year: 2016).*

*Primary Examiner* — Maurice C Smith
(74) *Attorney, Agent, or Firm* — Nath, Goldberg & Meyer; Jerald L. Meyer; Tanya E. Harkins

(57) ABSTRACT

A film thickness analysis method includes: acquiring film thickness values at a plurality of measurement points different from each other along a radial direction for a target film formed on an analysis target substrate by supplying a processing liquid while rotating the target substrate based on predetermined liquid processing conditions; and creating an approximate expression related to a film thickness distribution of the target film by approximating the film thickness values at the plurality of measurement points with respect to one Zernike polynomial. The approximate expression is created by specifying a coefficient related to the film thickness of the entire target substrate and one or more coefficients related to concentric curvature components, among a plurality of coefficients included in the Zernike polynomial.

12 Claims, 14 Drawing Sheets

(56) References Cited

FOREIGN PATENT DOCUMENTS

| WO | 2006077849 A1 | 7/2006 | |
|---|---|---|---|
| WO | WO-2017039170 A1 * | 3/2017 | ............. G01B 11/06 |
| WO | 2020092393 A1 | 5/2020 | |

* cited by examiner

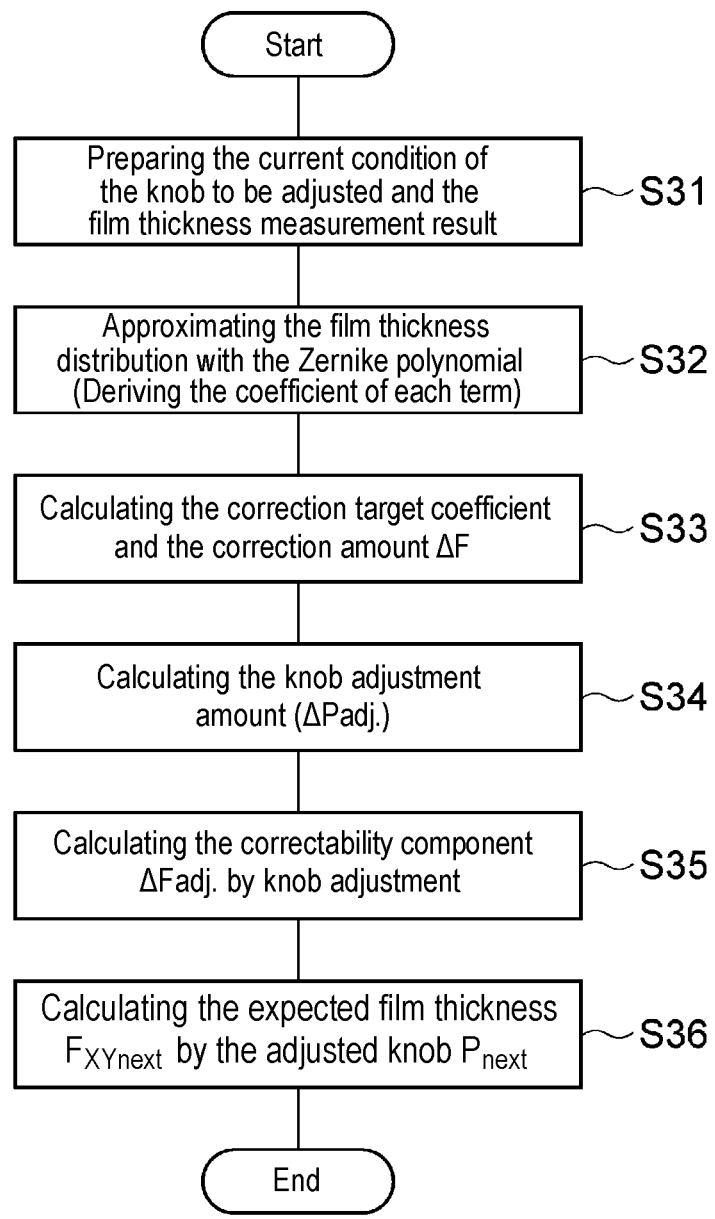

FIG. 11

| | |
|---|---|
| (a) | Adjustment amount calculation model<br>$\Delta P_{adj.} = \Delta F \cdot M$ |
| (b) | Adjustment amount $\Delta P_{adj.}$ = [Knob 1  Knob 2  Knob 3] |
| (c) | Correction target film thickness : $\Delta F = [Z_{001}\ Z_{004}\ Z_{009}\ Z_{016}]$ |
| (d) | Adjustment amount calculation matrix<br>$M = \begin{bmatrix} m_{11} & m_{12} & m_{31} \\ m_{21} & m_{22} & m_{32} \\ m_{31} & m_{23} & m_{33} \\ m_{41} & m_{24} & m_{34} \end{bmatrix}$ |
| (e) | Correctability component calculation model<br>$\Delta F_{adj.} = \Delta P_{adj.} \cdot N$ |
| (f) | Correctability component : $\Delta F_{adj.} = [Z_{adj.001}\ Z_{adj.004}\ Z_{adj.009}\ Z_{adj.016}]$ |
| (g) | Correctability component calculation matrix<br>$N = \begin{bmatrix} n_{11} & n_{12} & n_{31} & n_{14} \\ n_{21} & n_{22} & n_{32} & n_{24} \\ n_{31} & n_{23} & n_{33} & n_{34} \end{bmatrix}$ | ated by specifying a coefficient related to the film thickness
FILM THICKNESS ANALYSIS METHOD, FILM THICKNESS ANALYSIS DEVICE AND STORAGE MEDIUM This is a National Phase application filed under 35 U.S.C. 371 as a national stage of PCT/JP2022/003352, filed Jan. 28, 2022, an application claiming the benefit of Japanese Application No. 2021-015734, filed Feb. 3, 2021, and Japanese Application No. 2022-008452, filed Jan. 24, 2022, the content of each of which is hereby incorporated by reference in its entirety.

TECHNICAL FIELD

The present disclosure relates to a film thickness analysis method, a film thickness analysis device, and a storage medium.

BACKGROUND

Patent Document 1 discloses a configuration in which, for the purpose of making a film thickness profile of a coating film constant, a measured value is obtained at least at one point in a coating liquid supply process, and the suitability of discharging a coating liquid is determined based on the measured value.

PRIOR ART DOCUMENT

Patent Document

Patent Document 1: Japanese Patent Laid-open Publication No. 2003-93959

The present disclosure provides some embodiments of a technique capable of more appropriately estimating a tendency in film thickness distribution on a substrate.

SUMMARY

According to one embodiment of the present disclosure, a film thickness analysis method includes: acquiring film thickness values at a plurality of measurement points different from each other along a radial direction for a target film formed on an analysis target substrate by supplying a processing liquid while rotating the target substrate based on predetermined liquid processing conditions; and creating an approximate expression related to a film thickness distribution of the target film by approximating the film thickness values at the plurality of measurement points with respect to one Zernike polynomial, wherein, in creating the approximate expression, the approximate expression is created by specifying a coefficient related to the film thickness of the entire target substrate and one or more coefficients related to concentric curvature components, among a plurality of coefficients included in the Zernike polynomial.

According to the present disclosure, it is possible to provide a technique capable of more appropriately estimating a tendency in film thickness distribution on a substrate.

BRIEF DESCRIPTION OF DRAWINGS

FIG. 10 is a flowchart showing an example of a film thickness distribution estimation method and a processing condition correction method.
(a) to (g) of FIG. 11 are diagrams showing definitions of a calculation matrix used for correction of processing conditions and a related matrix.

DETAILED DESCRIPTION

Figure 1:
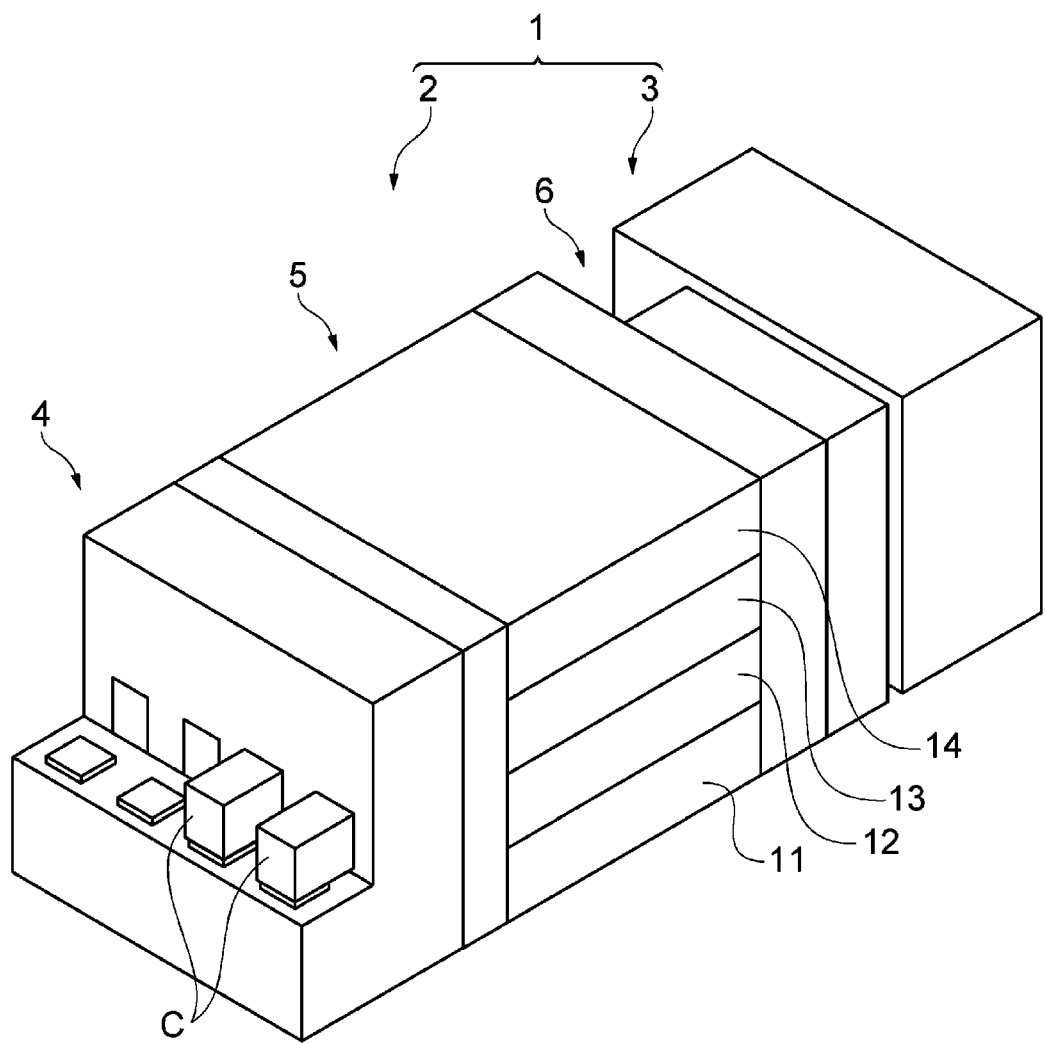
FIG. 1 is a schematic diagram showing an example of a substrate processing system.

Various exemplary embodiments will be described below.
A film thickness analysis method according to one embodiment of the present disclosure includes: acquiring film thickness values at a plurality of measurement points different from each other along a radial direction for a target film formed on an analysis target substrate by supplying a processing liquid while rotating the target substrate based on predetermined liquid processing conditions; and creating an approximate expression related to a film thickness distribution of the target film by approximating the film thickness values at the plurality of measurement points with respect to one Zernike polynomial, wherein, in the creating the approximate expression, the approximate expression is created by specifying a coefficient related to the film thickness of the entire target substrate and one or more coefficients related to concentric curvature components, among a plurality of coefficients included in the Zernike polynomial.

According to the film thickness analysis method described above, the approximate expression related to the film thickness distribution of the target film can be obtained by approximating the film thickness values at the plurality of measurement points obtained for the target film with respect to one Zernike polynomial. In this case, the approximate expression can be created by specifying the coefficient related to the film thickness of the entire target substrate and one or more coefficients related to concentric curvature components, among the plurality of coefficients included in the Zernike polynomial. With such a configuration, it is possible to obtain an approximate expression that appropriately reflects the characteristics of the coating film formed while rotating the target substrate. Moreover, by creating the approximate expression by this method, the film thickness distribution of the target film based on the measurement results at many measurement points can be described by one approximate expression. Therefore, it is possible to estimate the tendency of the film thickness distribution on the substrate more appropriately.

In approximating the film thickness values, the approximate expression may be created using a coefficient matrix, which is a matrix specifying a relationship between each of the measurement points and the plurality of coefficients included in the Zernike polynomial.

As described above, the concentric curvature components are defined in advance in the Zernike polynomial. Therefore, it is possible to specify which component of the Zernike polynomial the measured value at each point on the substrate is closely related to. Therefore, as described above, the approximate expression can be created in a simple and more appropriate manner by using the coefficient matrix, which is the matrix specifying the relationship between each of the measurement points and the plurality of coefficients included in the Zernike polynomial.

The approximate expression may include four types of terms of $0^{th}$, $2^{nd}$, $4^{th}$, and $6^{th}$ orders regarding the diameter of the target substrate.

The Zernike polynomials can also include higher order terms as components that are described using the diameter of the target substrate. In contrast, by creating the approximate expression so that the four types of terms of $0^{th}$, $2^{nd}$, $4^{th}$, and $6^{th}$ orders are included in the approximate expression, it is possible to prevent the coefficients used in the approximate expression from becoming complicated and to prevent overlearning when approximating the film thickness distribution.

The film thickness analysis method may further include: acquiring the liquid processing conditions when the target film is formed on the target substrate; and applying an adjustment amount calculation matrix, which is a calculation matrix that associates adjustment amounts of set values included in the liquid processing conditions with change amounts of a plurality of coefficients included in the created approximate expression, to a coefficient matrix obtained from the approximate expression related to the film thickness distribution of the target film on the target substrate, to thereby calculate the adjustment amount of the set value when bringing the film thickness distribution of the target film closer to a target value.

As described above, the adjustment amount calculation matrix, which is a calculation matrix that associates adjustment amounts of set values included in the liquid processing conditions with change amounts of a plurality of coefficients included in the created approximate expression, is applied to the coefficient matrix obtained from the approximate expression related to the film thickness distribution of the target film on the target substrate. As a result, the adjustment amount of the set value when bringing the film thickness distribution of the target film closer to the target value is calculated. By adopting the configuration in which the adjustment amount of the set value in the processing conditions is calculated using the approximate expression related to the film thickness distribution, the adjustment amount of the set value suitable for overall adjustment of the film thickness distribution on the target substrate can be calculated through simpler calculation.

The liquid processing conditions may include a plurality of set values in mutually independent processes.

When the plurality of set values in the liquid processing conditions to be adjusted are set values in mutually independent processes, it is possible to calculate the adjustment amount while excluding the relationship between different set values in the same process. Therefore, it is possible to accurately calculate the adjustment amount of the set value for bringing the film thickness distribution closer to the target value.

The one or more coefficients related to the concentric curvature components in the approximate expression may be coefficients corresponding to multiple types of terms related to the diameter of the target substrate in the Zernike polynomial, and in calculating the adjustment amount of the set value, the adjustment amount calculation matrix may be applied to the coefficient matrix obtained from the approximate expression after the coefficient of each term in the Zernike polynomial is subjected to weighting.

By weighting the coefficient of each term in the Zernike polynomial when calculating the adjustment amount of the set value, for example, the adjustment amount can be calculated in consideration of the degree of importance of the coefficients corresponding to the terms of multiple types of orders related to the diameter of the target substrate in the Zernike polynomial, and the like. Therefore, it is possible to calculate the adjustment amount in consideration of the characteristics such as the degree of importance of the terms of multiple types of orders in the Zernike polynomial, so that the adjustment amount can be calculated more appropriately.

The weighting may be set such that among the terms of multiple types of orders, a term of a lower order has a greater weight than a term of a higher order.

In general, in the Zernike polynomial, the term of a lower order may have a higher degree of importance than the term of a higher order. Therefore, by adopting the above configuration, the adjustment amount can be calculated more appropriately.

The weighting may be set based on variance of a basic function of each of the terms of multiple types of orders related to the diameter of the target substrate.

By adopting the above configuration, the conditions for calculating the adjustment amount can be adjusted based on the variance of the basic function. Therefore, the adjustment amount can be calculated more appropriately.

The one or more coefficients related to the concentric curvature components in the approximate expression may be coefficients corresponding to terms of multiple types of orders related to the diameter of the target substrate in the Zernike polynomial, and the film thickness analysis method may further include: before creating the approximate expression related to the film thickness distribution of the target film, creating a low-order approximate expression related to the film thickness distribution of the target film by approximating the film thickness values at the plurality of measurement points with respect to a low-order Zernike polynomial containing only terms related to the diameter of the target substrate whose orders are smaller than the orders in the Zernike polynomial used in creating the approximate expression, and determining whether or not each of the film thickness values at the plurality of measurement points is an abnormal value, based on a difference between the film thickness values at the points corresponding to the plurality of measurement points included in the low-order approximate expression and the film thickness values at the plurality of measurement points.

By adopting the above configuration, the low-order approximate expression can be created using the low-order Zernike polynomial containing only the terms smaller than the terms in the Zernike polynomial used in creating the approximate expression, and, for example, the film thickness value with a large difference between the low-order approximate expression and the film thickness value can be determined to be an abnormal value.

In creating the approximate expression, the approximate expression related to the film thickness distribution of the target film may be created by approximating a film thickness value different from the film thickness value determined to be the abnormal value among the film thickness values at the plurality of measurement points with respect to the Zernike polynomial.

By adopting the above configuration, it is possible to create the approximate expression without using the film thickness value determined to be an abnormal value. Therefore, it is possible to create an approximate expression that more accurately reflects the actual film thickness of the target film.

A film thickness analysis device according to one embodiment of the present disclosure includes: an acquisition part configured to acquire film thickness values at a plurality of measurement points different from each other along a radial direction for a target film formed on an analysis target substrate by supplying a processing liquid while rotating the target substrate based on predetermined liquid processing conditions; and an approximate expression creation part configured to create an approximate expression related to a film thickness distribution of the target film by approximating the film thickness values at the plurality of measurement points with respect to one Zernike polynomial, wherein the approximate expression creation part is configured to create the approximate expression by specifying a coefficient related to the film thickness of the entire target substrate and one or more coefficients related to concentric curvature components, among a plurality of coefficients included in the Zernike polynomial.

According to the film thickness analysis device described above, the approximate expression related to the film thickness distribution of the target film can be obtained by approximating the film thickness values at the plurality of measurement points obtained for the target film with respect to one Zernike polynomial. In this case, the approximate expression can be created by specifying the coefficient related to the film thickness of the entire target substrate and one or more coefficients related to concentric curvature components, among the plurality of coefficients included in the Zernike polynomial. This makes it possible to obtain an approximate expression that appropriately reflects the characteristics of the coating film formed while rotating the target substrate. Moreover, by creating the approximate expression by this method, the film thickness distribution of the target film based on the measurement results at many measurement points can be described by one approximate expression. Therefore, it is possible to estimate the tendency of the film thickness distribution on the substrate more appropriately.

A storage medium according to one embodiment of the present disclosure is a computer-readable storage medium storing a program for causing a device to perform the film thickness analysis method described above.

Various exemplary embodiments are described below in detail with reference to the drawings. In addition, the same or equivalent parts are designated by like reference numerals in each drawing.

[Substrate Processing System]

A substrate processing system 1 (substrate processing apparatus) shown in FIG. 1 is a system for forming a photosensitive film on a workpiece W, exposing the photosensitive film, and developing the photosensitive film. The workpiece W to be processed is, for example, a substrate, or a substrate on which a film, a circuit, or the like is formed by performing a predetermined process. The substrate is, for example, a silicon wafer. The workpiece W (substrate) may be circular. The workpiece W may be a glass substrate, a mask substrate, an FPD (Flat Panel Display), or the like. The photosensitive film is, for example, a resist film.

Figure 2:
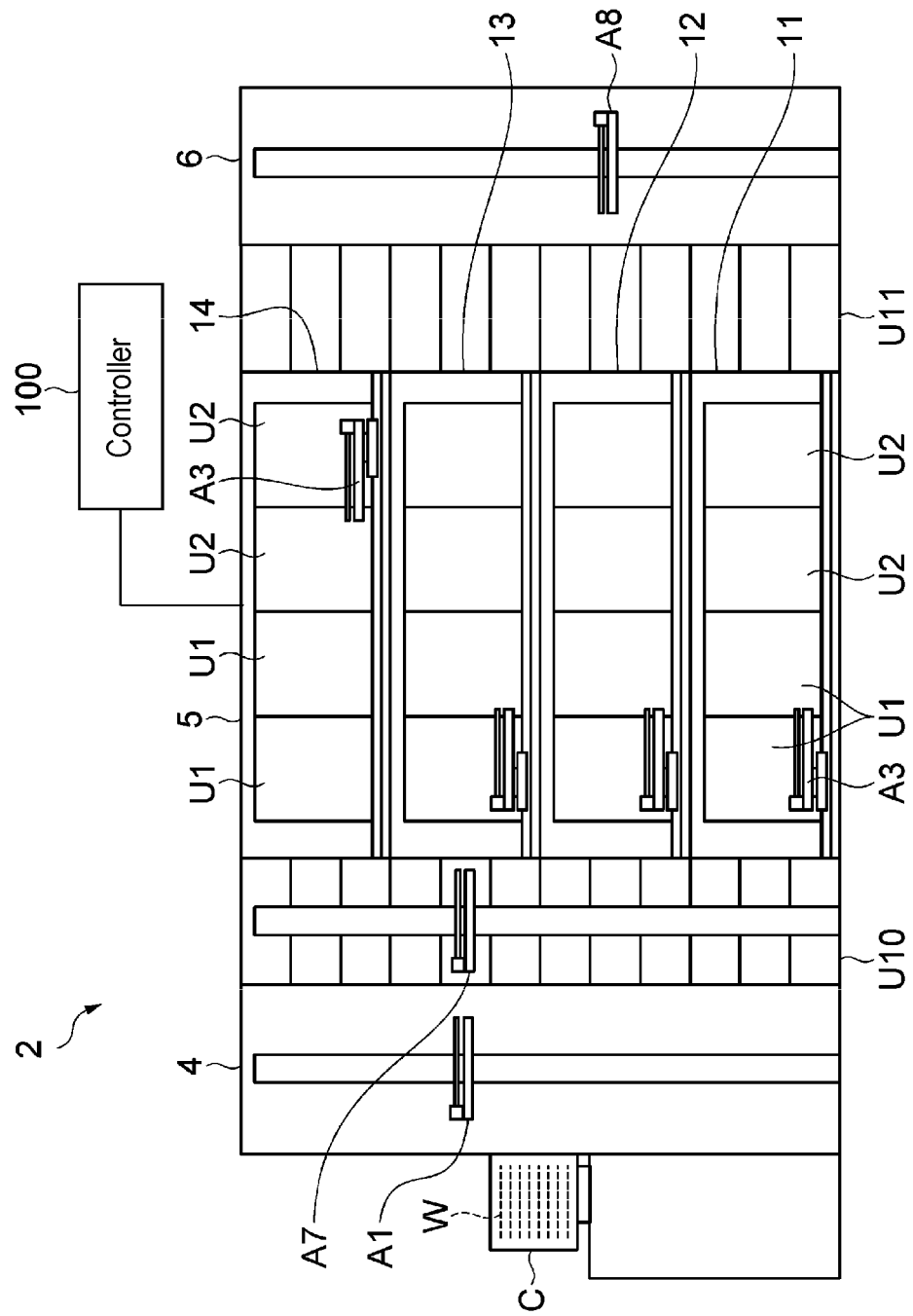
FIG. 2 is a schematic diagram showing an example of a coating developing apparatus.

As shown in FIGS. 1 and 2, the substrate processing system 1 includes a coating developing apparatus 2, an exposing apparatus 3, and a controller 100 (control part). The exposing apparatus 3 is an apparatus that exposes a resist film (photosensitive film) formed on a workpiece W (substrate). Specifically, the exposing apparatus 3 irradiates an exposure target portion of the resist film with an energy beam by a method such as liquid immersion exposure.

The coating developing apparatus 2 performs a process of coating a resist (chemical solution) on the surface of a workpiece W to form a resist film before performing an exposing process by the exposing apparatus 3, and performs a process of developing the resist film after the exposing process. The coating developing apparatus 2 includes a carrier block 4, a processing block 5, and an interface block 6.

The carrier block 4 loads the workpiece W into the coating developing apparatus 2 and unloads the workpiece W from the coating developing apparatus 2. For example, the carrier block 4 can support a plurality of carriers C for workpieces W, and incorporates a transfer device A1 including a delivery arm. The carrier C accommodates, for example, a plurality of circular workpieces W. The transfer device A1 takes out the workpiece W from the carrier C, transfers the workpiece W to the processing block 5, receives the workpiece W from the processing block 5, and returns the workpiece W to the carrier C. The processing block 5 includes processing modules 11, 12, 13 and 14.

The processing module 11 incorporates a liquid processing unit U1, a heat treatment unit U2, and a transfer device A3 for transferring the workpiece W to these units. The processing module 11 forms a lower layer film on the surface of the workpiece W using the liquid processing unit U1 and the heat treatment unit U2. An example of the lower layer film is an SOC (Spin-On-Carbon) film. The liquid processing unit U1 coats the workpiece W with a processing liquid for forming the lower layer film. The heat treatment unit U2 performs various heat treatments associated with the formation of the lower layer film.

The processing module 12 incorporates a liquid processing unit U1, a heat treatment unit U2, and a transfer device A3 for transferring the workpiece W to these units. The processing module 12 forms a resist film on the lower layer film by the liquid processing unit U1 and the heat treatment unit U2. The liquid processing unit U1 coats the lower layer film with a processing liquid for forming the resist film to form a film of the processing liquid on the lower layer film (on the surface of the workpiece W). The heat treatment unit U2 performs various heat treatments associated with the formation of the resist film.

The processing module 13 incorporates a liquid processing unit U1, a heat treatment unit U2, and a transfer device A3 for transferring the workpiece W to these units. The processing module 13 forms an upper layer film on the resist film using the liquid processing unit U1 and the heat treatment unit U2. The liquid processing unit U1 coats the resist film with a processing liquid for forming the upper layer film. The heat treatment unit U2 performs various heat treatments associated with the formation of the upper layer film.

The processing module 14 incorporates a liquid processing unit U1, a heat treatment unit U2, and a transfer device A3 that transfers the workpiece W to these units. The processing module 14 uses the liquid processing unit U1 and the heat treatment unit U2 to perform a developing process for the resist film subjected to the exposing process and a heat treatment associated with the developing process. The liquid processing unit U1 coats the surface of the exposed workpiece W with a developing liquid, and then rinses the developing liquid with a rinsing liquid, thereby performing the developing process for the resist film. The heat treatment unit U2 performs various heat treatments associated with the developing process. Specific examples of the heat treatment include a heating treatment before development (PEB: Post Exposure Bake) and a heating treatment after development (PB: Post Bake).

A shelf unit U10 is provided on the side of the carrier block 4 in the processing block 5. The shelf unit U10 is partitioned into a plurality of vertically aligned cells. A transfer device A7 including an elevating arm is provided in the vicinity of the shelf unit U10. The transfer device A7 raises and lowers the workpiece W between the cells of the shelf unit U10.

A shelf unit U11 is provided on the side of the interface block 6 in the processing block 5. The shelf unit U11 is partitioned into a plurality of vertically aligned cells.

The interface block 6 delivers the workpiece W to and from the exposure device 3. For example, the interface block 6 incorporates a transfer device A8 including a transfer arm and is connected to the exposing apparatus 3. The transfer device A8 transfers the workpiece W placed on the shelf unit U11 to the exposing apparatus 3. The transfer device A8 receives the workpiece W from the exposing apparatus 3 and returns the workpiece W to the shelf unit U11.

The controller 100 controls the coating developing apparatus 2 so as to execute a coating developing process, for example, in the following procedure. First, the controller 100 controls the transfer device A1 to transfer the workpiece W in the carrier C to the shelf unit U10, and controls the transport device A7 to arrange the workpiece W in the cell for the processing module 11.

Next, the controller 100 controls the transfer device A3 so as to transfer the workpiece W on the shelf unit U10 to the liquid processing unit U1 and the heat treatment unit U2 in the processing module 11. Further, the controller 100 controls the liquid processing unit U1 and the heat treatment unit U2 so as to form a lower layer film on the surface of the workpiece W. Thereafter, the controller 100 controls the transfer device A3 so as to return the workpiece W having the lower layer film to the shelf unit U10, and controls the transfer device A7 so as to arrange the workpiece W in the cell for the processing module 12.

Next, the controller 100 controls the transfer device A3 so as to transfer the workpiece W on the shelf unit U10 to the liquid processing unit U1 and the heat treatment unit U2 in the processing module 12. Further, the controller 100 controls the liquid processing unit U1 and the heat treatment unit U2 so as to form a resist film on the lower layer film of the workpiece W. Thereafter, the controller 100 controls the transfer device A3 so as to return the workpiece W to the shelf unit U10, and controls the transfer device A7 so as to place the workpiece W in the cell for the processing module 13.

Next, the controller 100 controls the transfer device A3 so as to transfer the workpiece W on the shelf unit U10 to each unit in the processing module 13. Further, the controller 100 controls the liquid processing unit U1 and the heat treatment unit U2 so as to form an upper layer film on the resist film of the workpiece W. Thereafter, the controller 100 controls the transfer device A3 so as to transfer the workpiece W to the shelf unit U11.

Next, the controller 100 controls the transfer device A8 so as to send the workpiece W on the shelf unit U11 to the exposing apparatus 3. Thereafter, the controller 100 controls the transfer device A8 so as to receive the workpiece W subjected to the exposing process from the exposing apparatus 3 and arrange the workpiece W in the cell of the shelf unit U11 for the processing module 14.

Next, the controller 100 controls the transfer device A3 so as to transfer the workpiece W on the shelf unit U11 to each unit in the processing module 14, and controls the liquid processing unit U1 and the heat treatment unit U2 so as to perform a developing process for the resist film of the workpiece W. Thereafter, the controller 100 controls the transfer device A3 to return the workpiece W to the shelf unit U10, and controls the transfer devices A7 and A1 so as to return the workpiece W to the carrier C. Thus, the coating developing process for one workpiece W is completed. The controller 100 controls the coating developing apparatus 2 so as to perform the coating developing process on each of a plurality of subsequent workpieces W in the same manner as described above.

The specific configuration of the substrate processing apparatus is not limited to the configuration of the substrate processing system 1 described above. The substrate processing apparatus may be of any type as long as it includes a liquid processing unit that supplies a processing liquid to a substrate to perform liquid processing and a controller that can control the same.

(Liquid Processing Unit)

Figure 3:
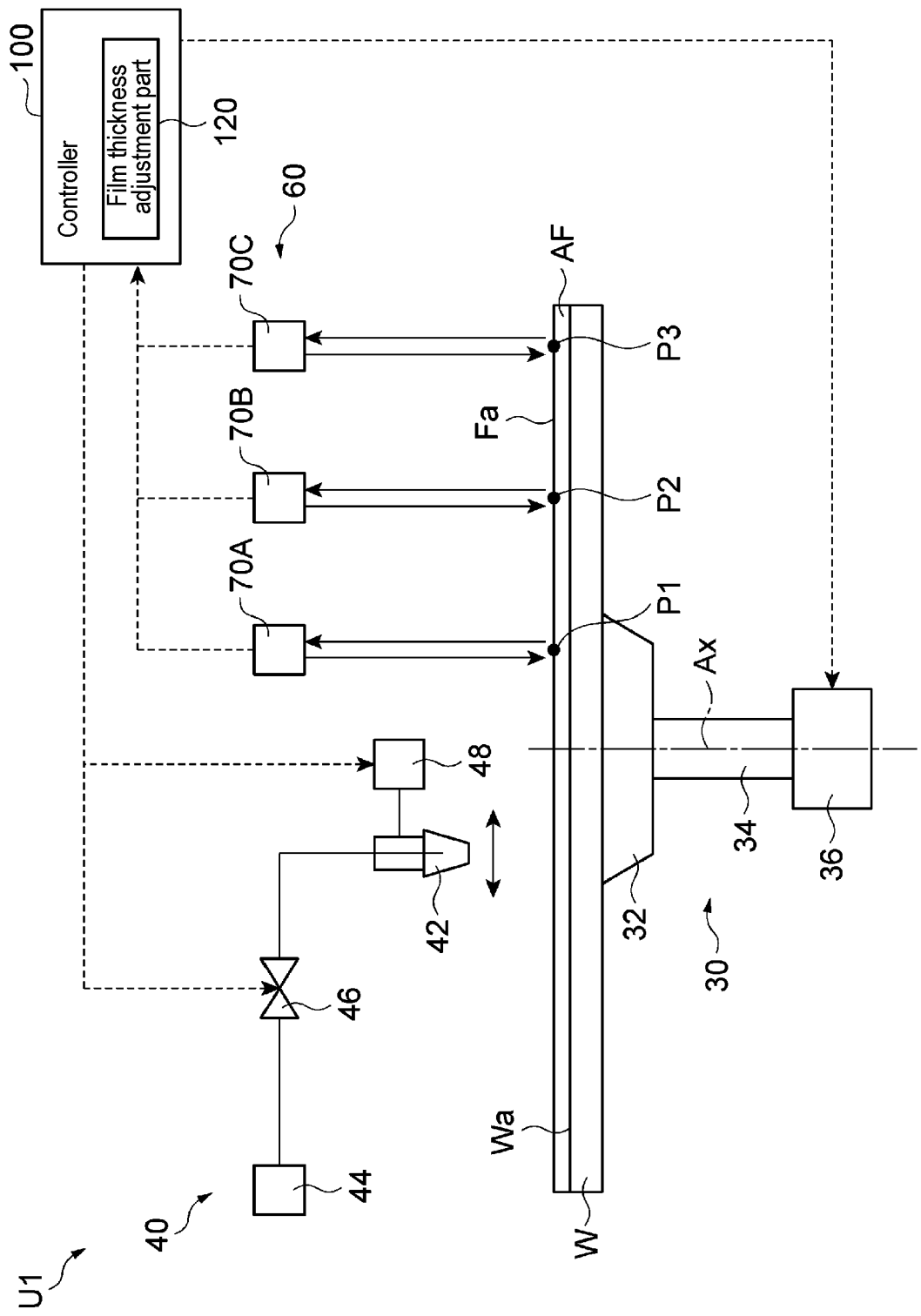
FIG. 3 is a schematic diagram showing an example of a liquid processing unit and a measurement part.

Next, an example of the liquid processing unit U1 of the processing module 12 will be described with reference to FIG. 3. The liquid processing unit U1 (liquid processing part) supplies a processing liquid to a surface Wa of the workpiece W, and then rotates the workpiece W having the surface Wa supplied with the processing liquid, so that a film of the processing liquid is formed on the surface Wa. Hereinafter, the liquid film of the processing liquid immediately after the processing liquid is supplied and the film before solidification subjected to volatilization along with the rotation of the workpiece W will be collectively referred to as "coating film AF." As shown in FIG. 3, the liquid processing unit U1 include a rotary holding part 30 and a processing liquid supply part 40.

The rotary holding part 30 holds and rotates the workpiece W. The rotary holding part 30 includes, for example, a holding part 32, a shaft 34, and a rotational driving part 36. The holding part 32 (support part) supports the workpiece W. The holding part 32 supports, for example, a central portion of the workpiece W horizontally arranged with the surface Wa facing upward, and holds the workpiece W by vacuum suction or the like. The upper surface (the surface supporting the workpiece W) of the holding part 32 may be formed in a circular shape when viewed from above, and may have a radius of about ⅙ to ½ times the radius of the workpiece W. The rotational driving part 36 is connected to the lower portion of the holding part 32 via the shaft 34.

The rotational driving part 36 is, for example, an actuator including a power source such as an electric motor or the like, and rotates the holding part 32 about a vertical axis Ax. As the holding part 32 is rotated by the rotational driving part 36, the workpiece W held (supported) by the holding part 32 is rotated. The holding part 32 may hold the workpiece W such that the center CP (see FIG. 4) of the workpiece W substantially coincides with the axis Ax.

The processing liquid supply part 40 supplies a processing liquid to the surface Wa of the workpiece W. The processing liquid is a solution (resist) for forming a resist film. The processing liquid supply part 40 includes, for example, a nozzle 42, a supply source 44, an opening/closing valve 46, and a nozzle driving part 48. The nozzle 42 discharges a processing liquid onto the surface Wa of the workpiece W held by the holding part 32. For example, the nozzle 42 is arranged above the workpiece W (vertically above the center CP of the workpiece W) to discharge the processing liquid downward. The supply source 44 supplies the processing liquid to the nozzle 42.

The opening/closing valve 46 is provided in a supply path between the nozzle 42 and the supply source 44. The opening/closing valve 46 switches the opening/closing state of the supply path. The nozzle driving part 48 moves the nozzle 42 between a discharge position above the workpiece W and a retracted position spaced apart from the discharge position. The discharge position is, for example, a position vertically above the rotation center of the workpiece W (a position on the axis Ax). A standby position is set at, for example, a position outside the periphery of the workpiece W.

(Measurement Part)

The coating developing apparatus 2 further includes a measurement part 60 for measuring the thickness of the coating film AF of the processing liquid. The measurement part 60 is provided in the liquid processing unit U1. The measurement part 60 irradiates the rotating workpiece W with light during the period in which the workpiece W supplied with the processing liquid is rotated and the coating film AF is formed. The measurement part 60 irradiates the surface Wa of the workpiece W held by the holding part 32 with light that can pass through the coating film AF (processing liquid) on the surface Wa, and receives the reflected light generated according to the irradiated light (reflected by the workpiece W).

The measurement part 60 includes, for example, light emitting/receiving devices 70A to 70C. The light emitting/receiving devices 70A to 70C respectively emit light toward irradiation points P1 to P3 overlapping with the surface Wa of the workpiece W on the holding part 32, and receive the reflected light reflected from the irradiation points P1 to P3. Each of the irradiation points P1 to P3 is a fixed position and is not changed even if the workpiece W rotates. Each of the light emitting/receiving devices 70A to 70C irradiates the surface Wa of the workpiece W with laser light as irradiation light. Each of the light emitting/receiving devices 70A to 70C emits laser light that can pass through the coating film AF of the processing liquid formed on the surface Wa.

The laser light emitted from each of the light emitting/receiving devices 70A to 70C may be visible light or infrared light. The wavelength of the laser light may be 500 nm to 1,200 nm, 600 nm to 1,100 nm, or 780 nm to 1,000 nm. The wavelength of the laser light may be set according to the type of the processing liquid. For example, the wavelength of the laser light is set so as not to promote the reaction in the processing liquid and so as to reduce light absorption.

The frequencies of the laser light emitted from the light emitting/receiving devices 70A to 70C may be different from each other. That is, the frequency of the light emitted from the light emitting/receiving device 70A toward the irradiation point P1 may be different from the frequency of the light emitted from the light emitting/receiving device 70B (or the light emitting/receiving device 70C) toward the irradiation point P2 (or the irradiation point P3). The light source included in each of the light emitting/receiving devices 70A to 70C may be a laser diode or an LED. The beam width of the laser light may be several millimeters to several tens of millimeters.

Figure 4:
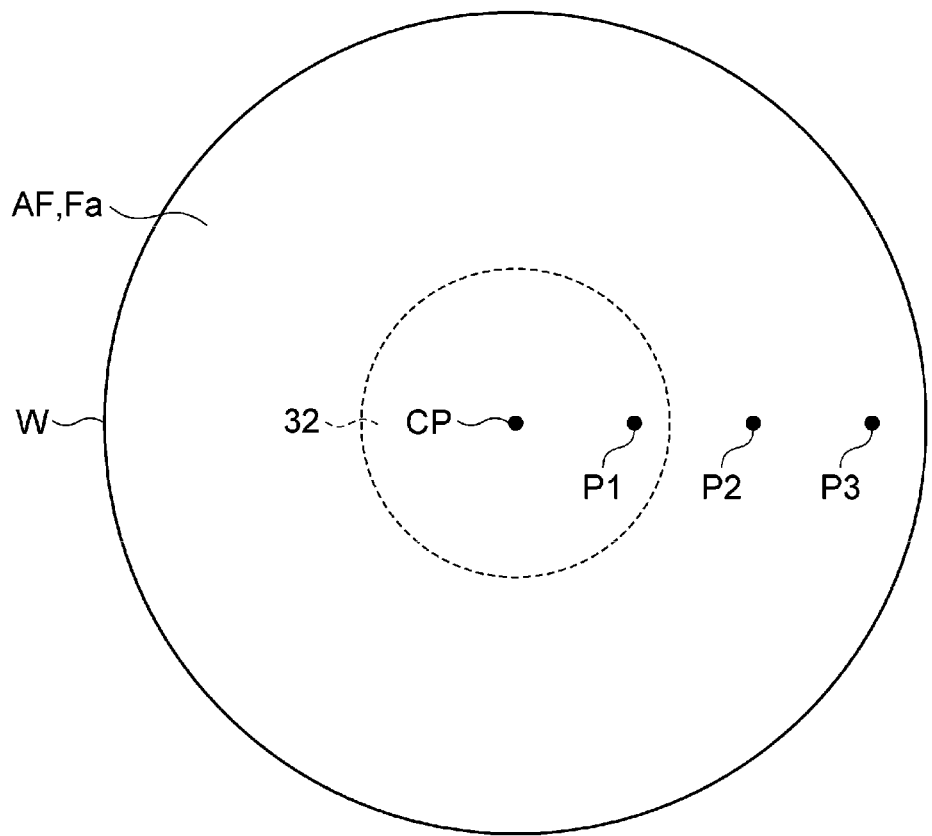
FIG. 4 is a schematic diagram showing an example of an irradiation position of light irradiated from the measurement part.

The irradiation points P1 to P3 of the light (laser light) emitted from the light emitting/receiving devices 70A to 70C are set at different positions as shown in FIG. 4. That is, the measurement part 60 emits the laser light toward the irradiation point P1 (point) and the irradiation points P2 and P3 (different points) overlapping with the surface Wa of the workpiece W at positions different from the irradiation point P1. The distance between the irradiation point P1 of the light emitted from the light emitting/receiving device 70A and the center CP of the workpiece W, the distance between the irradiation point P2 of the light emitted from the light emitting/receiving device 70B and the center CP of the workpiece W, and the distance between the light irradiation point P3 of the light emitted from the light emitting/receiving device 70C and the center CP of the workpiece W are different from each other. In one example, the distance between the irradiation point P1 and the center CP of the workpiece W is smaller than the distance between the irradiation point P2 and the center CP of the workpiece W. The distance between the irradiation point P2 and the center CP of the workpiece W is smaller than the distance between the irradiation point P3 and the center CP of the workpiece W.

The irradiation point P1, the irradiation point P2, and the irradiation point P3 may be arranged in a line in the named order from the center CP of the workpiece W along the radial direction of the workpiece W. The irradiation point P1, the irradiation point P2, and the irradiation point P3 may be arranged at approximately equal intervals. The irradiation point P1 is located at the center of the surface Wa of the workpiece W. Specifically, the irradiation point P1 is set so as to overlap with the upper surface of the holding part 32 (the surface that supports the back surface of the workpiece W). The irradiation point P3 positioned at an outer side is located in a region near the peripheral edge of the workpiece W (peripheral edge region). As described above, the light emitting/receiving devices 70A to 70C function as light emitting parts that emit light toward predetermined points overlapping with the surface Wa of the workpiece W.

The light emitting/receiving devices 70A to 70C may generate electrical signals according to the intensity of the reflected light. Since the laser light can pass through the coating film AF on the surface Wa of the workpiece W, the laser light is reflected by the outer surface Fa (upper surface) of the coating film AF at the irradiation point, and is output through the coating film AF after being reflected by the surface Wa of the workpiece W positioned below the coating film AF. Thereafter, the laser light is outputted through the coating film AF. In the present disclosure, the surface Wa of the workpiece W that reflects a part of the laser light is the surface of the base material of the workpiece W, or the surface of an additional film that exists under the coating film AF and is already solidified. The additional film may be, for example, a film (e.g., the lower layer film) that exists directly under the coating film AF.

The light emitting/receiving device 70A receives light outputted from the irradiation point P1. Specifically, the light emitting/receiving device 70A receives the reflected light obtained by combining the light reflected from the surface Wa of the workpiece W and then outputted via the coating film AF at the irradiation point P1, and the light reflected from the outer surface Fa of the coating film AF. At each of the irradiation points P2 and P3, the laser light is reflected by the outer surface Fa of the coating film AF and the surface Wa of the workpiece W located below the coating film AF. That is, just like the light emitting/receiving device 70A, the light emitting/receiving devices 70B and 70C also receive the light outputted from the irradiation points P2 and P3, respectively. More specifically, the light emitting/receiving devices 70B and 70C receive the reflected light obtained by combining the light outputted through the coating film AF after being reflected by the surface Wa of the workpiece W at the irradiation points P2 and P3 and the light reflected by the outer surface Fa of the coating film AF. As described above, the light emitting/receiving devices 70A to 70C also function as light receiving parts that receive reflected light obtained by combining the light reflected by the outer surface Fa of the coating film AF of the processing liquid on the surface Wa and the light reflected by the surface Wa.

Figure 5A:
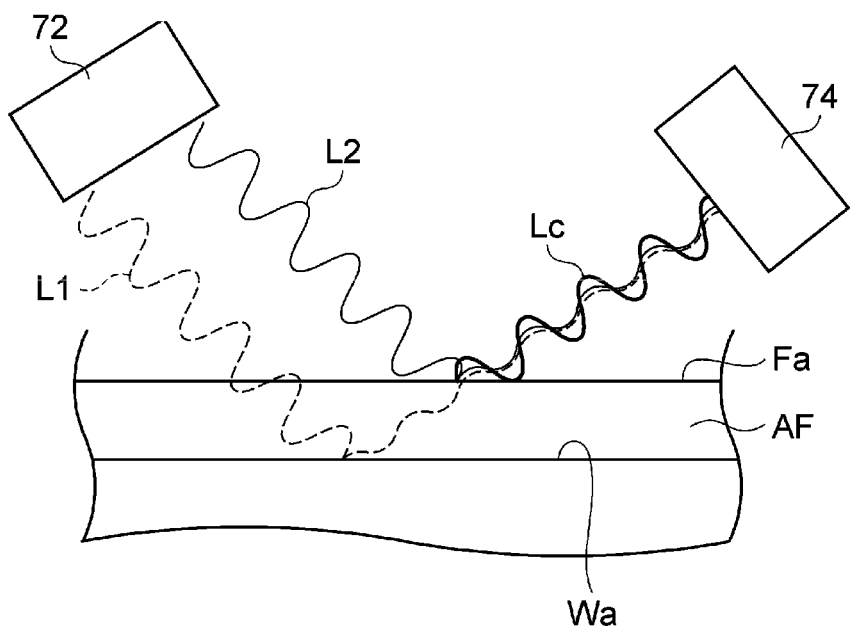
FIGS. 5A and 5B are schematic diagrams for explaining a relationship between a film thickness and reflected light.
Figure 5B:
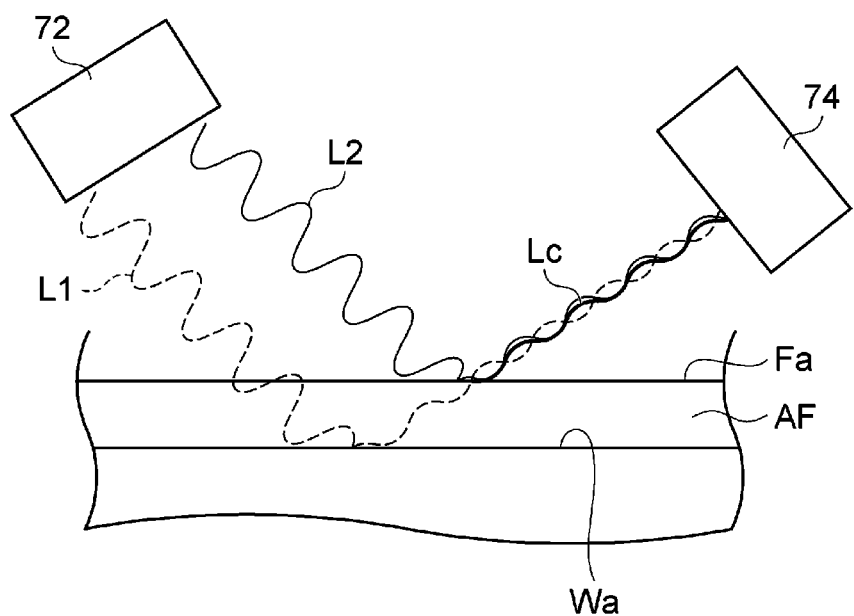

Now, a time-dependent change in the intensity of the reflected light will be described with reference to FIGS. 5A and 5B. The reflected light has an intensity corresponding to the thickness of the coating film AF during the period in which the coating film AF of the processing liquid is formed on the surface Wa of the workpiece W. In FIGS. 5A and 5B, the part of any of the light emitting/receiving devices that emits laser light is indicated by "light emitting part 72." and the part of any of the light emitting/receiving devices that receives the reflected light is indicated by "light receiving part 74." Unlike FIG. 3, FIGS. 5A and 5B illustrate a case where light is incident obliquely on the surface Wa.

The reflected light of the laser light emitted toward the surface Wa of the workpiece W includes the light L1 and the light L2 after the later light is transmitted through the coating film AF of the processing liquid and reflected from the surface Wa as described above. The light L1 is light outputted to the outside through the coating film AF. Further, the light L2 is light that is reflected by the outer surface Fa of the coating film AF without being incident into the coating film AF. The reflected light received by the light receiving part 74 becomes reflected light Lc obtained by combining light L1 and light L2. The phase of the light L2 with respect to the light L1 is changed depending on the thickness of the coating film AF. There may be a case where the light L1 and the light L2 strengthen each other and a case where the light L1 and the light L2 weaken each other. As shown in FIG. 5A, when the ridge portions of the amplitude of the light L1 overlap with the ridge portions of the amplitude of the light L2, the light L1 and the light L2 strengthen each other so that the intensity of the reflected light increases. On the other hand, as shown in FIG. 5B, when the ridge portions of the amplitude of the light L1 overlap with the valley portions of the amplitude of the light L2, the light L1 and the light L2 weaken each other so that the intensity of the reflected light decreases.

Immediately after the processing liquid is supplied to the surface Wa, a liquid film of the processing liquid is formed. Thereafter, by rotating the workpiece W, the solidification (volatilization) of the coating film AF gradually progresses. Therefore, the thickness of the coating film AF gradually decreases during the period in which the workpiece W is rotated. Thus, the phase of the light L2 with respect to the light L1 is also changed, and the state of the light L1 and the light L2 strengthening each other and the state of the light L1 and the light L2 weakening each other are repeated. As a result, a waveform in which ridge portions and valley portions are alternately repeated is obtained as a waveform representing the time-dependent change in the intensity of the reflected light (see FIG. 6). In the substrate processing system 1 of the present disclosure, the thickness of the coating film AF (film thickness) is estimated based on this waveform. The details of the film thickness estimation method will be described later.

Further, in the substrate processing system 1, the conditions for forming the coating film AF may be adjusted based on the estimation result of the film thickness. Specifically, the controller 100 of the substrate processing system 1 adjusts the processing conditions for adjusting the film thickness estimation result and the target film thickness. The details of the method of adjusting the processing conditions will also be described later.

(Controller)

Figure 7:
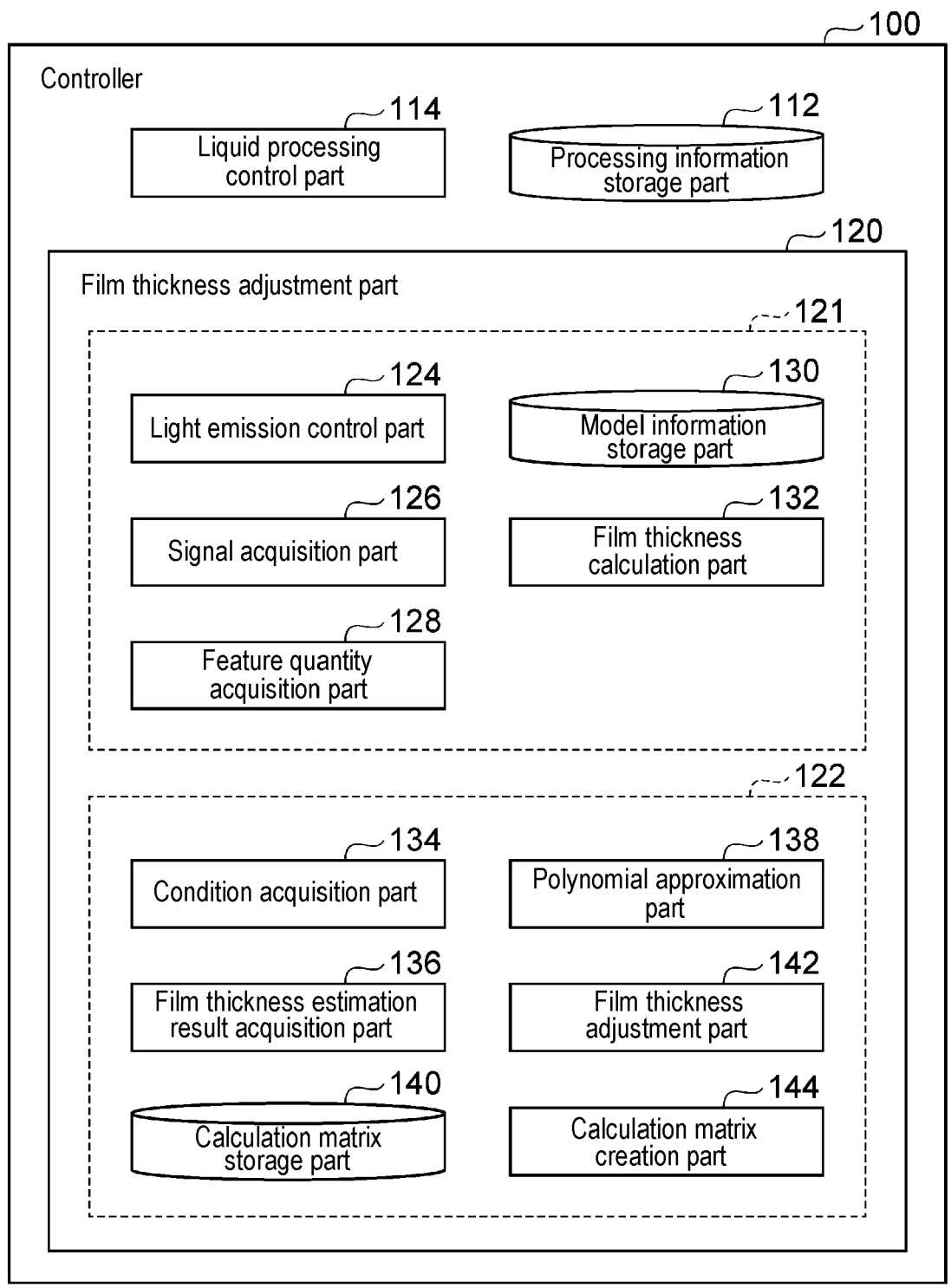
FIG. 7 is a block diagram showing an example of a functional configuration of a controller.

The controller 100 causes the coating developing apparatus 2 to process the workpiece W by partially or wholly controlling the coating developing apparatus 2. As shown in FIG. 7, the controller 100 includes, for example, a processing information storage part 112, a liquid processing control part 114, and a film thickness adjustment part 120 as functional configurations (hereinafter referred to as "functional modules"). The processes executed by these functional modules correspond to the processes executed by the controller 100.

The processing information storage part 112 stores processing information regarding liquid processing for the workpiece W. Various conditions for executing the liquid processing are set in the processing information. For example, as set values for various conditions, the timing (time) for starting and stopping the discharge of the processing liquid, the rotational speed (number of rotations) of the workpiece W at the time of discharge of the processing liquid, and the like are predetermined. Moreover, for example, as set values for various conditions, the rotational speed of the workpiece W when forming the coating film AF on the surface Wa after the processing liquid is supplied, the rotation time of the workpiece W when forming the coating film AF, and the like are also predetermined.

The liquid processing control part 114 controls the liquid processing unit U1 so that the workpiece W is subjected to liquid processing. The liquid processing control part 114 controls the rotary holding part 30 and the processing liquid supply part 40 so as to perform the liquid processing on the workpiece W according to various conditions defined in the processing information stored in the processing information storage part 112.

The film thickness adjustment part 120 includes a film thickness estimation function 121 for estimating the film thickness and a film thickness adjustment function 122 for adjusting the film thickness estimated by the film thickness estimation function 121. The film thickness estimation function 121 is a function of acquiring from the measurement part 60 a waveform (hereinafter referred to as a "signal waveform") that indicates the time-dependent change in the intensity of the reflected light reflected from the workpiece W, and estimating the thickness of the coating film AF on the surface Wa based on the signal waveform. The film thickness adjustment function 122 is a function of adjusting the processing conditions based on the film thickness estimation result and adjusting the thickness of the coating film AF to be coated on the workpiece W to be processed next time to a target film thickness.

As shown in FIG. 7, the film thickness adjustment part 120 includes, for example, a light emission control part 124, a signal acquisition part 126, a feature quantity acquisition part 128, a model information storage part 130, and a film thickness calculation part 132, as a functional module related to the film thickness estimation function 121.

The light emission control part 124 controls the light emitting/receiving devices 70A to 70C so as to emit light toward the irradiation points overlapping with the surface Wa of the workpiece W during the rotation period in which the rotary holding part 30 of the liquid processing unit U1 rotates the workpiece W after the processing liquid is supplied. The light emission control part 124 may start the light irradiation from the light emitting/receiving devices 70A to 70C before starting the discharge of the processing liquid in the liquid processing of the workpiece W. After stopping the rotation for forming the coating film AF, the light emission control part 124 stops the light irradiation from the light emitting/receiving devices 70A to 70C.

The signal acquisition part 126 acquires from each light emitting/receiving device a signal waveform indicating a time-dependent change in the intensity of the reflected light received by the light emitting/receiving device during the rotation period. The signal acquisition part 126 may acquire the intensity of the reflected light at a predetermined sampling period. The sampling period is set such that the change in the state of interference between the light L1 reflected by the surface Wa and the light L2 reflected by the outer surface Fa of the coating film AF can be grasped by the signal waveform. The sampling period may be set to approximately several tens of ms to several hundreds of ms.

The feature quantity acquisition part 128 acquires a feature quantity from a waveform between a predetermined measurement time point within the rotation period and a time point at which the signal waveform satisfies a predetermined condition before the measurement time point in the signal waveform acquired by the signal acquisition part 126. The feature quantity is a value acquired from the signal waveform according to a predetermined condition, and is correlated with the thickness of the coating film AF. For example, the feature quantity acquisition part 128 acquires a feature quantity from the signal waveform for each of the irradiation points P1 to P3.

The model information storage part 130 stores a model formula constructed in advance to estimate the thickness of the coating film AF. This model formula is constructed so as to indicate a relationship between the feature quantity of the signal waveform and the estimated value of the film thickness.

The film thickness calculation part 132 calculates the film thickness of the coating film AF at the measurement time point based on the feature quantity acquired by the feature quantity acquisition part 128. For example, the film thickness calculation part 132 calculates the thickness of the coating film AF for each of the irradiation points P1 to P3 based on the feature quantity. The measurement time point may be set at any time point within the rotation period. The measurement time is set, for example, at the end of the rotation period (the time point at which the workpiece W stops rotating). In this case, the film thickness calculation part 132 calculates the thickness of the coating film AF at the end of the rotation period. The film thickness calculation part 132 may calculate the thickness of the coating film AF at the measurement time point by applying the model formula held in the model information storage part 130.

The model formula can be created, for example, by the following method. For example, for a plurality of test workpieces W, while performing liquid processing by changing the rotation speed at a plurality of levels, the feature quantity based on the signal waveform and the measured value of the thickness of the coating film AF at the measurement time point are acquired for each level. The model formula indicating the relationship between the estimated value of the thickness of the coating film AF and the feature quantity is created based on the feature quantity for each of the plurality of levels for changing the rotational speed and the measured value of the thickness of the coating film AF, which are obtained by the above procedure. The model formula may be created in the coating developing apparatus 2 or may be created in another coating developing apparatus 2. The model formula may be prepared for each irradiation point, or one model formula may be prepared for a plurality of irradiation points.

The film thickness adjustment part 120 includes each part shown in FIG. 7 as the functional module related to the film thickness adjustment function 122. Specifically, the film thickness adjustment unit 120 includes, for example, a condition acquisition part 134, a film thickness estimation result acquisition part 136, a polynomial approximation part 138, a calculation matrix storage part 140, a film thickness adjustment condition calculation part 142, and a calculation matrix creation part 144.

The condition acquisition part 134 acquires from the processing information storage part 112 set values of a plurality of liquid processing conditions for the results of film thickness estimation. The liquid processing conditions acquired from the processing information storage part 112 are conditions that are considered to affect the film thickness of the coating film AF. The number of rotations of the workpiece W is a representative condition of liquid processing that affects the film thickness. Specifically, examples of the number of rotations of the workpiece W include the number of rotations of the workpiece W when the processing liquid is supplied to the surface of the workpiece W, the number of rotations of the workpiece W when the processing liquid is spread on the surface of the workpiece W by a centrifugal force, the number of rotations of the workpiece W when the supplied processing liquid is shaken off from the surface of the workpiece W, the number of rotations of the workpiece W when the processing liquid is fixed to the surface of the workpiece W, and the like. It is known that these number of rotations of the workpieces W affect the film thickness. Further, the time that the processing liquid remains until the processing liquid is fixed onto the workpiece W, the surrounding environment, and the like may also affect the film thickness. In addition, as the conditions for the liquid processing actually acquired from the processing information storage part 112, it may be possible to select conditions whose values can be relatively easily adjusted during the liquid processing. Examples of such conditions include the number of rotations when the processing liquid is discharged, the reflow time after the processing liquid is discharged, and the number of rotations of the workpiece W when the processing liquid is shaken off after being discharged. The type of condition from which the condition acquisition part 134 acquires a set value is predetermined, and the condition to be acquired can be said to be the condition to be adjusted (adjustment knob). The plurality of adjustment knobs used here may be processing conditions (set values) in mutually different processes, or may be processing conditions in the same process. The mutually different processes refer to steps in which the operation related to the liquid processing is changed, such as "before supplying the processing liquid," "during the supply of the processing liquid," "during reflow," and "time to shake off the processing liquid." By selecting the processing conditions (set values) in mutually different processes as the plurality of adjustment knobs, it becomes unnecessary to consider the interactions between the adjustment knobs.

The film thickness estimation result acquisition part 136 acquires the estimation result of the thickness of the coating film AF related to the target workpiece W. The estimation result is the result calculated by the film thickness calculation part 132. The estimation result is used as it is.

The polynomial approximation part 138 approximates the estimation result of the thickness of the coating film AF to the coefficients of a Zernike polynomial. When correcting the film thickness, the distribution of the film thickness of the coating film AF on the surface of the workpiece W is approximated to the Zernike polynomial. The adjustment knob to be adjusted to correct the film thickness and the adjustment amount thereof are estimated by using this.

Now, the Zernike polynomial will be briefly described. The Zernike polynomial is a complex function on a unit circle of radius 1 (practically used as a real number function), which is often used in the field of optics. The Zernike polynomial has polar coordinate arguments (r, θ). The Zernike polynomial is mainly used to analyze aberration components of lenses in the field of optics. By decomposing the wavefront aberration using the Zernike polynomial, it is possible to know the aberration components based on the shapes of independent wavefronts, such as a mountain shape and a saddle shape.

In the present embodiment, for example, the estimated values of the film thickness at many points on the workpiece W are indicated in the radial direction of the workpiece, and the points of the estimated values of the film thickness are connected by a smooth curved surface, thereby capturing an in-plane distribution of the film thickness in the plane of the workpiece W as a wavefront that undulates up and down. Using the Zernike polynomial, the film thickness distribution Z in the plane of the workpiece W can be decomposed into a plurality of annular in-plane tendency components Zi including curvature components that are convex or concave curves. The magnitude of each in-plane tendency component Zi can be represented by a Zernike coefficient.

The Zernike coefficients representing the respective in-plane tendency components Zi are specifically expressed by the following formulae using arguments (r, θ) of polar coordinates. In the present disclosure, the Zernike coefficients are described in the order of notation based on Fringe.

Z1(1)
Z2(r·cos θ)
Z3(r·sin θ)
Z4(2r²−1)
Z5(r²·cos 2θ)
Z6(r²·sin 2θ)
Z7((3r³−2r)cos θ)
Z8((3r³−2r)sin θ)

$$Z9(6r^4 - 6r^2 + 1)$$

...

$$Z16(20r^6 - 30r^4 + 12r^2 + 1)$$

...

In the present embodiment, among the Zernike coefficients, four types of coefficients Z1, Z4, Z9, and Z16 are used. The coefficient Z1 corresponds to an average value of the film thickness in the work plane (Z-direction deviation component). Z4, Z9, and Z16 are all concentric curvature components, and indicate irregularities different from each other. Further, when the above four types of coefficients are used, the zero-order term (constant term), the second-order term ($r^2$), the fourth-order term ($r^4$), and the sixth-order term ($r^6$) regarding the diameter r of the workpiece W are included in the four types of coefficients.

The estimation result of the thickness of the coating film AF includes estimation results of the film thickness at a plurality of measurement points along the radial direction. Therefore, by expressing the distribution of the film thicknesses in the plane of the workpiece W obtained from the film thickness estimation results at the respective points through the use of the Zernike polynomial, it is possible to describe the distribution of the film thicknesses by combining four feature quantities (Zernike coefficients). When approximation is performed using the Zernike polynomial, a least squares method may be used. As a result of the approximation, coefficients Z1, Z4, Z9 and Z16 are obtained. The coefficients Z1, Z4, Z9, and Z16 obtained by the approximation are used for film thickness correction and the like. Details will be described later.

The calculation matrix storage part 140 stores calculation matrices used for adjusting the thickness of the coating film AF. The calculation matrix storage part 140 stores two types of calculation matrices. The first calculation matrix is a calculation matrix related to a relationship between the amount of change in each coefficient obtained by the Zernike polynomial to be described later and the adjustment amount of the adjustment knob required to realize the change in each term. In addition, the second calculation matrix is a calculation matrix related to a relationship between the adjustment amount of the adjustment knob and the amount of change in the film thickness due to the adjustment of the knob. These matrices will be described later.

The film thickness adjustment condition calculation part 142 calculates the correction conditions for forming the coating film AF having a predetermined film thickness and the expected film thickness based on the correction, from the set values of the liquid processing conditions acquired by the condition acquisition part 134 and the film thickness estimation result acquired by the film thickness estimation result acquisition part 136. Two types of calculation matrices stored in the calculation matrix storage part 140 are used to calculate the expected film thickness based on the correction conditions and the correction. Details of the calculation of the expected film thickness based on the correction conditions and the correction will be described later.

The calculation matrix creation part 144 has a function of creating a first calculation matrix and a second calculation matrix. When creating the calculation matrices, for example, liquid processing is performed on a plurality of test workpieces W by changing the adjustment knob in a plurality of steps, and the thickness of the coating film AF is acquired. Then, the calculation matrix creation part 144 creates the two types of calculation matrices based on the amount of change of the adjustment knob and the measured value of the thickness of the coating film AF. Details of the creation of the calculation matrices will also be described later.

Figure 8:
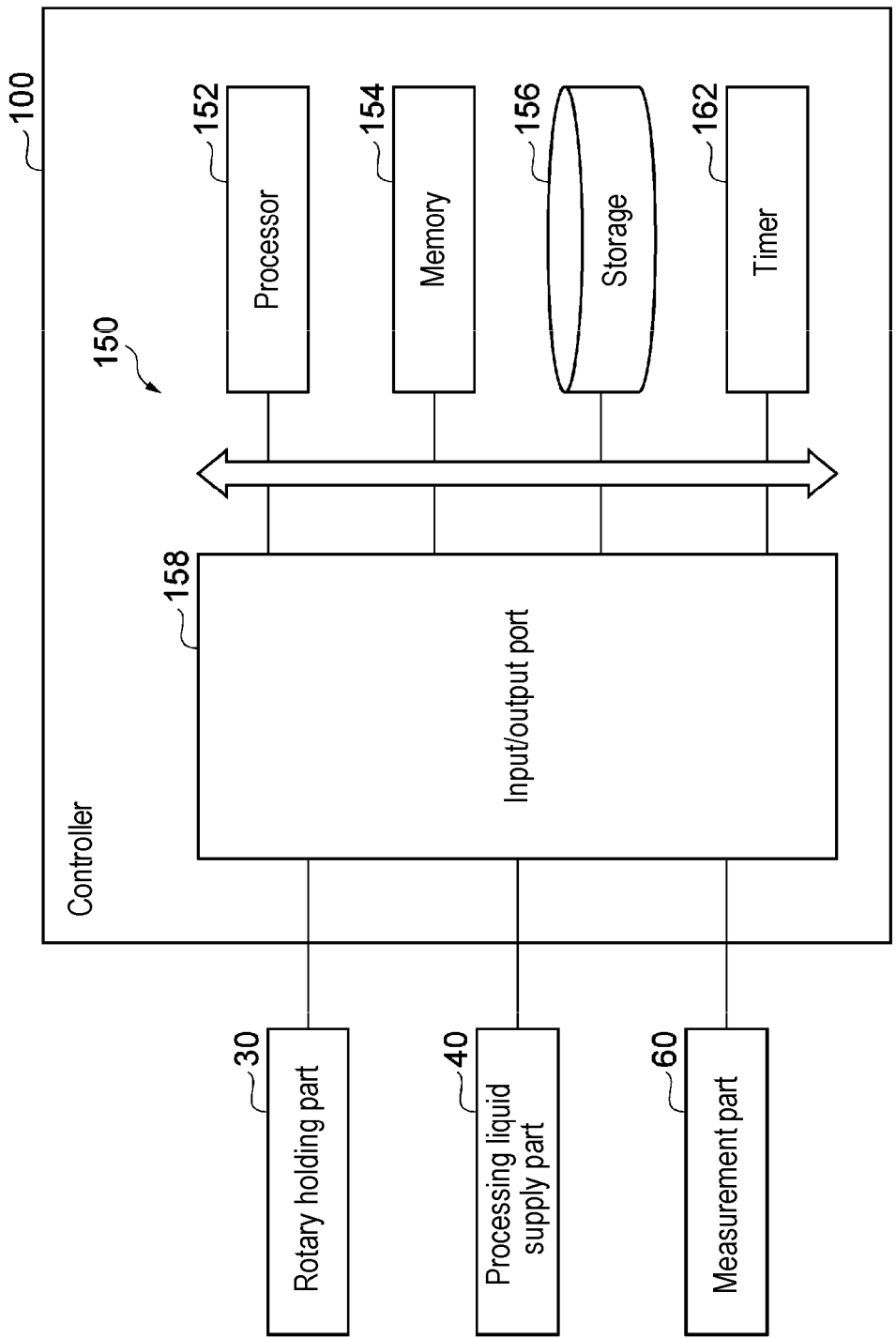
FIG. 8 is a block diagram showing an example of a hardware configuration of the controller.

The controller 100 is composed of one or more control computers. For example, the controller 100 includes a circuit 150 shown in FIG. 8. The circuit 150 includes one or more processors 152, a memory 154, a storage 156, an input/output port 158, and a timer 162. The storage 156 includes a computer-readable storage medium such as a hard disk or the like. The storage medium stores a program for causing the controller 100 to execute a substrate processing method and a film thickness estimation method, which will be described later. The storage medium may be a removable medium such as a non-volatile semiconductor memory, a magnetic disk, an optical disk, or the like.

The memory 154 temporarily stores the program loaded from the storage medium of the storage 156 and the calculation result obtained by the processor 152. The processor 152 cooperates with the memory 154 to execute the above program, thereby providing each of the above-described functional modules. The input/output port 158 inputs and outputs electric signals to and from the rotary holding part 30, the processing liquid supply part 40, the measurement part 60, and the like according to the commands from the processor 152. The timer 162 measures the elapsed time by, for example, counting reference pulses of a constant cycle.

When the controller 100 is composed of a plurality of control computers, each functional module may be realized by an individual control computer. The controller 100 may be composed of a control computer including a functional module for executing liquid processing by the liquid processing unit U1, and a control computer including a functional module (film thickness adjustment part 120) for estimating the thickness of the coating film AF. Alternatively, each of these functional modules may be realized by a combination of two or more control computers. In these cases, the control computers may cooperate with each other to execute a substrate processing method and a film thickness estimation method, which will be described later, while being communicably connected to each other. The hardware configuration of the controller 100 is not necessarily limited to providing each functional module by a program. For example, each functional module of the controller 100 may be composed of a dedicated logic circuit or an ASIC (Application Specific Integrated Circuit) that integrates the dedicated logic circuit.

[Thickness Estimation Process of Coating Film]

Subsequently, as an example of the substrate processing method, an example of a process related to liquid processing and a process related to estimation of the thickness of the coating film AF, which are executed by the controller 100, will be described. In the controller 100, a process for performing liquid processing by the liquid processing unit U1 and a process for estimating the thickness of the coating film AF (film thickness estimation method) are performed in parallel. In the following, a case will be described in which the end point of the rotation period after the supply of the processing liquid is completed is set to a measurement time point at which the film thickness is estimated (hereinafter referred to as "measurement time point MT").

Figure 9:
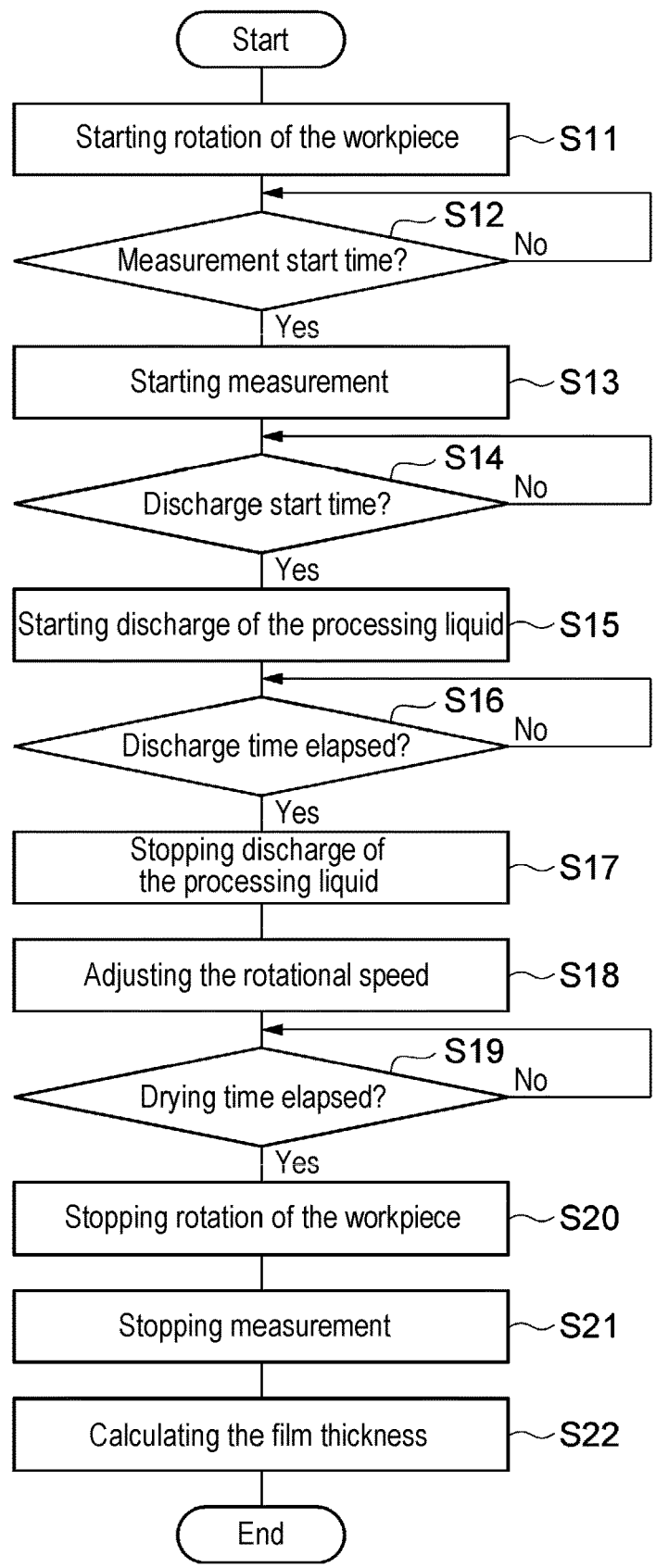
FIG. 9 is a flowchart showing an example of a film thickness estimation method.

FIG. 9 is a flowchart showing an example of the above-described processes executed by the controller 100 for liquid processing and film thickness estimation. The controller 100 executes step S11 by receiving a command from a host controller. In step S11, for example, the liquid processing control part 114 controls the rotary holding part 30 so as to start rotating the workpiece W. After the workpiece W starts to rotate, the liquid processing control unit 114 controls the rotary holding part 30 so that the workpiece W rotates at the set value of the rotational speed when the processing liquid is discharged.

Next, the controller 100 executes steps S12 and S13. In step S12, for example, the film thickness adjustment part 120 waits until a predetermined measurement start time. The measurement start time is, for example, a time determined based on the time at which the command from the host controller is received. In step S13, for example, the film thickness adjustment part 120 controls the measurement part 60 so as to start measuring the intensity of the reflected light. In one example, the light emission control part 124 controls the light emitting/receiving devices 70A to 70C so as to start irradiation of laser light toward the irradiation points P1 to P3, respectively. Then, the signal acquisition part 126 starts acquiring the intensity of the reflected light according to the irradiation of the laser light from each of the light emitting/ receiving devices 70A to 70C. In the subsequent processing, the irradiation of the laser light and the acquisition of the intensity of the reflected light are continued.

Next, the controller 100 executes steps S14 and S15. In step S14, for example, the liquid processing control part 114 waits until a predetermined discharge start time. The discharge start time is, for example, a time determined based on the time at which the command from the host controller is received. In step S15, for example, the liquid processing control part 114 controls the processing liquid supply part 40 so as to start discharging the processing liquid.

Next, the controller 100 executes steps S16, S17 and S18. In step S16, for example, the liquid processing control part 114 waits until a predetermined discharge time is elapsed from the discharge start time of the processing liquid. In step S17, for example, the liquid processing control part 114 controls the processing liquid supply part 40 so as to stop discharging the processing liquid. In step S18, for example, the liquid processing control part 114 controls the rotary holding part 30 to adjust the rotational speed of the workpiece W so that the workpiece W rotates at the set value of the rotational speed after the processing liquid is supplied. The set value of the rotational speed is defined in the processing information stored in the processing information storage part 112.

Next, the controller 100 executes steps S19 and S20. In step S19, for example, the liquid processing control part 114 waits until a predetermined drying time is elapsed from the discharge stop time of the processing liquid. In step S20, for example, the liquid processing control part 114 controls the rotary holding part 30 to stop rotating the workpiece W. By executing steps S19 and S20 described above, the workpiece W supplied with the processing liquid is rotated for a predetermined drying time, and a coating film AF of the processing liquid is formed on the surface Wa of the workpiece W during the rotation. The period during which the workpiece W is rotated for the drying time corresponds to the rotation period during which the workpiece W is rotated after the processing liquid is supplied.

Next, the controller 100 executes step S21. In step S21, for example, the film thickness adjustment part 120 controls the measurement part 60 to stop measuring the intensity of the reflected light. In one example, the light emission control part 124 controls the light emitting/receiving devices 70A to 70C so as to stop emitting the laser light toward the irradiation points P1 to P3, respectively. Then, the signal acquisition part 126 stops acquiring the intensity of the reflected light accompanying the irradiation of the laser light. By executing the processing up to step S21, a signal waveform (time-dependent change in the intensity of the reflected light) shown in FIG. 6 is acquired for each of the irradiation points P1 to P3.

Figure 6:
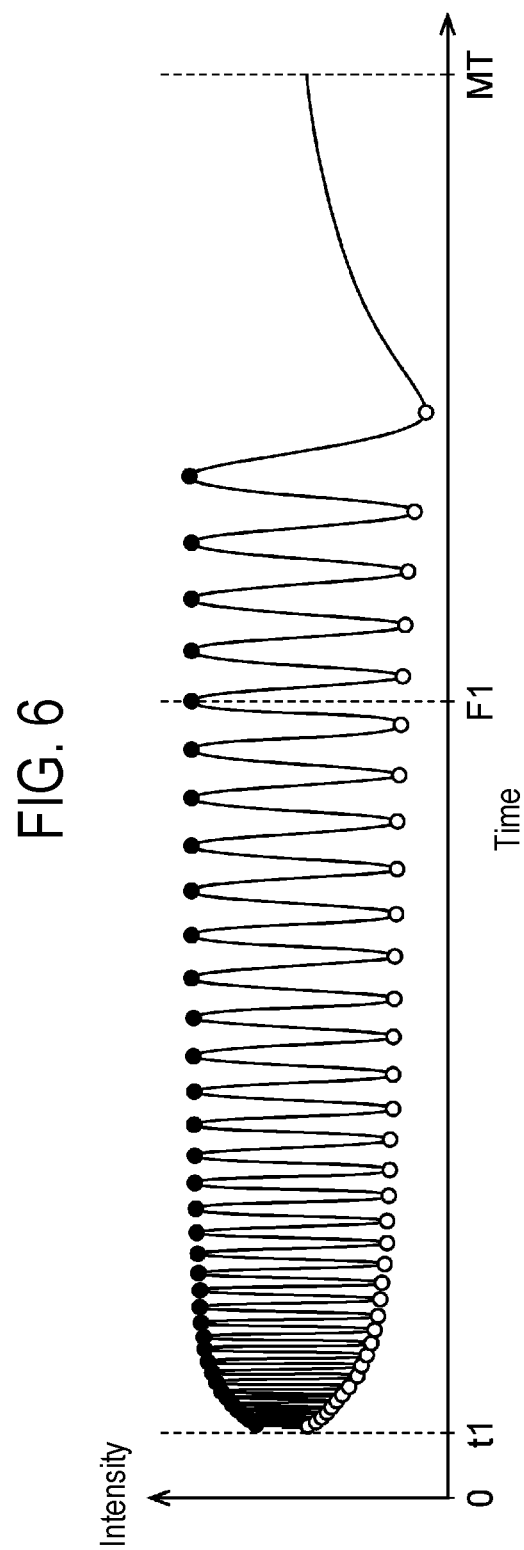
FIG. 6 is a graph showing an example of a time-dependent change in the intensity of the reflected light.

In the graph of the signal waveform shown in FIG. 6, the timing at which the processing start command is received from the host controller is indicated by "0," and the timing at which the discharge of the processing liquid is stopped (the timing at which the drying time is started) is indicated by "t1." Furthermore, in FIG. 6, the measurement time point corresponding to the end timing of the drying time is indicated by "MT." As shown in FIG. 6, from time t1 onwards, a signal waveform in which ridge portions and valley portions are repeated is obtained depending on the time-dependent change in the state of interference between the light L1 reflected by the surface Wa and the light L2 reflected by the outer surface Fa of the coating film AF. In FIG. 6, the peak points of the ridge portions are depicted by black circles, and the lowest points of the valley portions are depicted by white circles. The signal waveform before time t1 is omitted.

After executing step S21, the controller 100 executes step S22. In step S22, for example, the film thickness calculation part 132 calculates the thickness of the coating film AF at the measurement time point MT. Specifically, the thickness of the coating film AF at the measurement time point MT is calculated based on the waveform between the measurement time point MT and the time point at which the signal waveform satisfies a predetermined condition before the measurement time point MT in the signal waveform obtained until the execution of step S21. More specifically, the feature quantity acquisition part 128 acquires a feature quantity from the waveform between the measurement time point MT and the time point at which the signal waveform satisfies a predetermined condition before the measurement time point MT in the signal waveform described above. Then, the film thickness calculation part 132 calculates the thickness of the coating film AF at the measurement time point MT based on the feature quantity.

The feature quantity obtained from a portion of the signal waveform is, for example, the time of the n-th (where n is an integer equal to or greater than 1) extremum point counted from the measurement time point MT. That is, the feature quantity acquisition part 128 acquires, as the feature quantity, the time of the n-th extremum point of the waveform from the waveform between the measurement time point MT and the time point at which the signal waveform satisfies the condition that the signal waveform becomes the n-th extremum point counted in the backward direction from the measurement time point MT. In the present disclosure, the extremum points collectively refer to the peak points (maximum points) of the ridge portions and the lowest points (minimum points) of the valley portions.

In the graph of the signal waveform illustrated in FIG. 6, the time of the tenth extremum point counted from the measurement time point MT (the peak point of the fifth ridge portion counted from the measurement time point MT) is acquired as a feature quantity F1. In the graph of the signal waveform shown in FIG. 6, the ninth extremum point counted from the measurement time point MT is the lowest point of the fifth valley portion counted from the measurement time point MT. The feature quantity F1 corresponds to the time between the reference timing of liquid processing (e.g., the timing of receiving the processing start command from the host controller described above) and the n-th extreme point counted from the measurement time point MT.

The film thickness calculation part 132 uses the correlation between the feature quantity F1 and the thickness of the coating film AF to calculate the thickness of the coating film AF at the measurement time point MT based on the feature quantity F1. A method of calculating the thickness of the coating film AF using the correlation will be described later. For example, the film thickness calculation part 132 calculates the thickness of the coating film AF at each irradiation position based on the signal waveform for each of the irradiation points P1 to P3.

In the above-described manner, a series of processes for liquid processing and film thickness estimation for one workpiece W is completed. The controller 100 may sequentially execute a similar series of processes on a plurality of subsequent workpieces W. In this case, the controller 100 may repeatedly execute a series of processes so that the above-described various processing conditions (the timing, the number of rotations, the drying time, etc.) are constant among the plurality of workpieces W.

Before executing the series of processes on the workpiece W, a model formula for estimating the thickness of the coating film AF is constructed. In the model formula, the coating film AF is formed by changing the rotational speed of the test workpiece WT in a plurality of steps, and the acquisition of the feature quantity and the measurement of the thickness of the coating film AF are performed for each step. As a result, a model formula representing the relationship between the feature quantity and the estimated value of the thickness of the coating film AF is constructed. The range in which the rotational speed of the test workpiece WT is changed (the difference between the maximum rotational speed and the minimum rotational speed) is, for example, 80 rpm to 300 rpm, and the width of change per time is 5 rpm to 50 rpm. The range may be changed according to the conditions for formation of the coating film AF.

[Coating Film Thickness Correction Method (Film Thickness Analysis Method)]

Next, as an example of the substrate processing method, an example of a process related to adjustment of the thickness of the coating film AF (film thickness analysis method) executed by the controller 100 will be described. This process is performed by the film thickness adjustment function 122 of the film thickness adjustment part 20 after the film thickness estimation function 121 of the film thickness adjustment part 120 of the controller 100 performs a film thickness estimation process. In the following description, a case where the film thickness analysis is performed on the workpiece W on which the coating film AF is formed will be described. This workpiece W corresponds to a target substrate.

FIG. 10 is a flowchart showing an example of the above-described processes executed by the controller 100 for liquid processing and film thickness estimation. The controller 100 executes step S31 by receiving a command from the host controller. In step S31, for example, the condition acquisition part 134 acquires information about the processing conditions when the workpiece W is subjected to liquid processing. At this time, the condition acquisition part 134 acquires from the processing information storage part 112 the set values of the conditions of the liquid processing for the result of the film thickness estimation. In this regard, the parameters related to the liquid processing conditions acquired by the condition acquisition part 134 are parameters whose set values are subject to change when adjusting the film thickness. Such parameters may be referred to as adjustment knobs or simply knobs in the embodiments described below. Further, in step S31, the film thickness estimation result acquisition part 136 acquires the film thickness estimation result related to the workpiece W. As the film thickness estimation result at this time, the calculation result of the coating film AF obtained by the film thickness calculation part 132 is used as it is. Therefore, the estimation result of the film thickness may also be said to be the measurement result of the film thickness of the coating film AF. As a result of the above procedure, the set values of the conditions for the liquid processing and the information regarding the thickness of the coating film AF resulting from the liquid processing for a specific workpiece W are prepared. The set values of the current liquid processing conditions (knobs) are defined as current knobs $P_{current}$.

Next, the controller 100 executes step S32. In step S32, for example, the polynomial approximation part 138 derives coefficients Z1, Z4, Z9 and Z16 of respective terms by approximating the estimation result of the film thickness of the workpiece W acquired by the film thickness estimation result acquisition part 136 with a Zernike polynomial. In this process, the respective terms are calculated by the approximation using a least squares method.

A method of deriving the four coefficients Z1, Z4, Z9 and Z16 will be described in detail. First, as a preparation, the coefficient matrix Z and its inverse matrix $Z_{inv}$, which are auxiliary matrices for specifying the degree of contribution to the Zernike polynomial, are calculated for each point where the film thickness is measured. This can be obtained by transforming the position of each of the measurement points in an XY space into a Zernike space defined by the above coefficients.

The matrix F indicating the approximate film thickness after approximating the film thickness distribution of the estimation result (which can be said to be the measurement result) by the Zernike approximation may be described using the following equation (1) where $F_{XYcurrent}$ denotes the estimation result in the XY space.

$$F = F_{XYcurrent} \cdot Z_{inv} \quad (1)$$

The Zernike coefficients Z1, Z4, Z9 and Z16 can be derived using equation (1).

Next, the controller 100 executes steps S33 and S34. In step S33, for example, the film thickness adjustment condition calculation part 142 calculates a correction target coefficient and ΔF, which specifies a correction amount thereof, by comparing the coefficient derived by the polynomial approximation part 138 with the coefficient corresponding to a target film thickness distribution. Further, in step S34, the film thickness adjustment condition calculation part 142 calculates $\Delta P_{adj.}$, which is the adjustment amount of the knob, based on ΔF.

The coating film AF is originally required to be formed flat on the surface of the workpiece W. Therefore, the target film thickness is required to take a predetermined value regardless of the location within the workpiece W. Thus, in the target film thickness distribution, the coefficient Z1 should be a predetermined value, and Z4, Z9 and Z16 should be zero. Therefore, the correction target film thickness ΔF for the target film thickness in the Zernike space can be calculated by taking the difference of Z1 from F.

If the value of the knob can be adjusted so that the correction corresponding to the correction target film thickness ΔF can be performed in the Zernike space, the film thickness becomes the target value. If a calculation matrix that specifies the relationship between the adjustment amount of the knob and the correction amount ΔF in the Zernike space is stored in advance, it is possible to specify the adjustment amount of each knob when the correction target film thickness ΔF is known.

Therefore, the adjustment amount of the knob can be calculated by storing the calculation matrix M for calculating the adjustment amount from the correction target film thickness ΔF as a first calculation matrix and applying the calculation matrix M to the correction target film thickness ΔF.

The model for calculating the correction amount of the knob and the elements included in the model are described with reference to (a) to (g) of FIG. 11. (a) of FIG. 11 shows a model used to calculate the adjustment amount $\Delta P_{adj.}$ of the knob. (b), (c) and (d) of FIG. 11 respectively show the definitions of the adjustment amount $\Delta P_{adj.}$, the correction target film thickness ΔF, and the adjustment amount calculation matrix (first calculation matrix) M included in the model for calculating the adjustment amount $\Delta P_{adj.}$.

As shown in (a) of FIG. 11, the adjustment amount $\Delta P_{adj.}$ is obtained by multiplying the correction target film thickness ΔF and the adjustment amount calculation matrix M. Here, the correction target film thickness ΔF is a coefficient element related to the difference between the actual film thickness and the target film thickness in a state approximated to the Zernike polynomial as described above. The adjustment amount calculation matrix M is a calculation matrix that associates the adjustment amount of the knob and the change amount of the film thickness, and is a calculation matrix used when deriving the adjustment amount of the knob necessary to realize the change amount of the film thickness. As an example, when there are three types of knobs (knobs 1 to 3) and four coefficients used in the approximation using the Zernike polynomial, the adjustment amount calculation matrix M is obtained as a matrix of 4 rows×3 columns. A method of calculating the adjustment amount calculation matrix M will be described later. The adjustment amount calculation matrix M is prepared in advance and stored in the calculation matrix storage part 140 of the controller 100.

Next, the controller 100 executes steps S35 and S36. In step S35, for example, the film thickness adjustment condition calculation part 142 calculates the correctability component $\Delta F_{adj.}$ in the Zernike space by the adjustment of the knob using the adjustment amount $\Delta P_{adj.}$ calculated in step S34. Further, in step S35, the film thickness when the coating film AF is formed under the processing conditions based on the adjusted knob is predicted.

The model for calculating the correctability component and the elements included in the model are described with reference to (a) to (g) of FIG. 11. (e) of FIG. 11 shows a model used to calculate the correctability component $\Delta F_{adj.}$. Further, (f) and (g) of FIG. 11 respectively show the definitions of the correctability component $\Delta F_{adj.}$ and the correctability component calculation matrix (second calculation matrix) N.

As described above, in step S34, the knob adjustment amount $\Delta P_{adj.}$ is calculated. The correctability component $\Delta F_{adj.}$ is obtained by calculating how much the coefficient of each term in the Zernike polynomial is corrected as a result of adjusting the knob. Specifically, as shown in (e) of FIG. 11, the correctability component $\Delta F_{adj.}$ is obtained by multiplying the knob adjustment amount $\Delta P_{adj.}$ and the correctability component calculation matrix N. The correctability component calculation matrix N is a calculation matrix that associates the adjustment amount of the knob and the change amount of the film thickness, and is a calculation matrix used when the change amount of the film thickness is estimated from the adjustment amount of the knob during the determination of the adjustment amount of the knob. The adjustment amount calculation matrix M and the correctability component calculation matrix N are associated with each other as described above. The pseudo-inverse matrix of the adjustment amount calculation matrix M may be associated with the correctability component calculation matrix N. As an example, if there are three types of knobs (knobs 1 to 3) and there are four coefficients used in the approximation using the Zernike polynomial, the correctability component calculation matrix N is obtained as a matrix of 3 rows×4 columns. A method of calculating the correctability component calculation matrix N will be described later. The correctability component calculation matrix N is prepared in advance and stored in the calculation matrix storage part 140 of the controller 100.

The correctability component $\Delta F_{adj.}$ in the Zernike polynomial can be calculated by storing the calculation matrix N for calculating how much the coefficients in the Zernike polynomial can be corrected from the adjustment amount of the knob as a second calculation matrix and applying the second calculation matrix to the knob adjustment amount $\Delta P_{adj.}$ Furthermore, when the adjustment amount $\Delta P_{adj.}$ is obtained, the adjusted knob $P_{next}$ can be calculated. Further, when the correctability component $\Delta F_{adj.}$ is obtained, the expected film thickness $F_{XYnext}$, which is the film thickness after adjusting the knob, can be calculated from the correctability component $\Delta F_{adj.}$ The adjusted knob $P_{next}$ is obtained by reflecting the knob adjustment amount $\Delta P_{adj.}$ calculated by the above procedure to the current knob $P_{current}$, and can be obtained as $P_{current}-\Delta P_{adj.}$. Meanwhile, the expected film thickness $F_{XYnext}$ is obtained by reflecting the correctability component $\Delta F_{adj.}$ to the film thickness estimation result $F_{XYcurrent}$ corresponding to current film thickness. However, the correctability component $\Delta F_{adj.}$ is a coefficient in the Zernike polynomial. Therefore, the correctability component $\Delta F_{adj.}$ is first converted into the correctability component $\Delta F_{XYadj.}$ in the XY space. The correctability component $\Delta F_{XYadj.}$ is calculated by, for example, multiplying $\Delta F_{adj.}$ and the coefficient matrix Z.

Further, the expected film thickness $F_{XYnext}$ is calculated by the following equation (2) using the film thickness estimation result $F_{XYcurrent}$ corresponding to the current film thickness and the correctability component $\Delta F_{XYadj.}$ $$F_{XYnext} = F_{XYcurrent} - \Delta F_{XYadj} \quad (2)$$

As a result, it is possible to calculate an expected result on the film thickness after adjustment of the knob with respect to the film thickness estimation result $F_{XYcurrent}$ in the XY space.

[Method of Calculating the Adjustment Amount Calculation Matrix M and the Correctability Component Calculation Matrix N]

Figure 12:
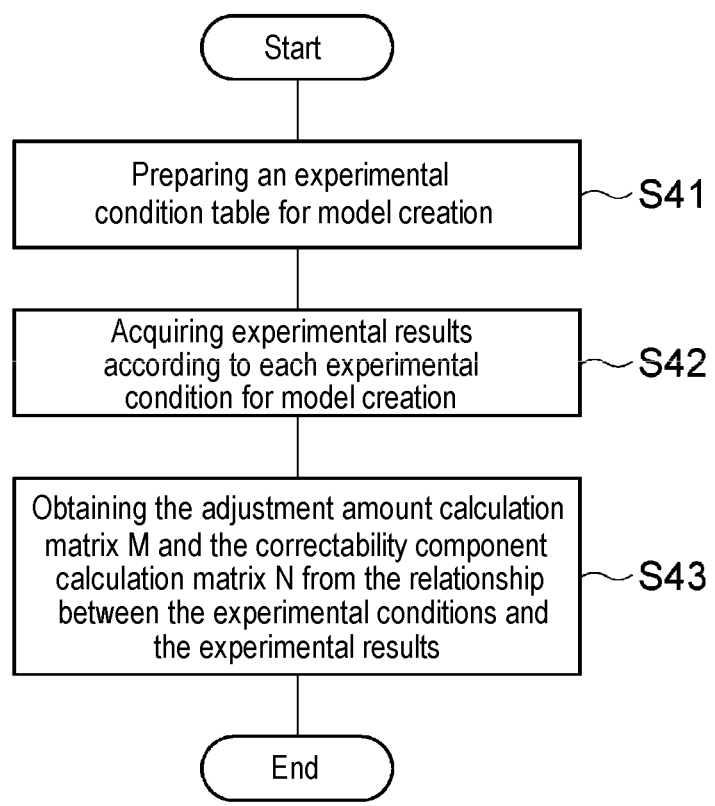
FIG. 12 is a flowchart showing an example of a method of calculating a calculation matrix used for correction of processing conditions.
(a) and (b) of FIG. 13 are diagrams for explaining an example of an outline of correction using a weighting matrix.

An example of a method of calculating the adjustment amount calculation matrix M and the correctability component calculation matrix N used in the process related to the adjustment of the thickness of the coating film AF executed by the controller 100 (see FIG. 10) is described with reference to FIG. 12. This processing is performed in the calculation matrix creation part 144 of the controller 100. FIG. 12 is a flowchart showing an example of the above-described processes executed by the controller 100. The series of processes shown in FIG. 12 is performed before performing the liquid processing on the workpiece W that requires film thickness estimation and correction, or performed at an arbitrary timing such as when it is determined that the adjustment amount calculation matrix M and the correctability component calculation matrix N need to be corrected.

First, the controller 100 executes step S41. In step S41, for example, the calculation matrix creation part 144 prepares an experimental condition table necessary for creating a calculation matrix (model). As described above, the calculation matrices M and N are matrices related to how the film thickness is changed when changing the knob serving as the liquid processing condition. Therefore, the creation of the calculation matrices M and N requires experimental data for grasping how the film thickness is changed when the knobs that can be adjusted are changed within an assumed range. Thus, in step S41, experimental conditions necessary for creating a model are identified. It is considered that necessary information for the calculation matrices M and N is collected by forming the coating film AF on the workpieces W under various conditions using a larger number of workpieces W and evaluating changes in the film thickness. However, considering the work efficiency for preparing the calculation matrices M and N, it is desired that the assumed conditions can be covered with a somewhat limited number of experiments. Therefore, a well-known experimental design method or the like may be used to select appropriate experimental conditions and prepare an experimental condition table. This experimental condition table can be used as a matrix regarding conditions when calculating the calculation matrices M and N.

Next, the controller 100 executes step S42. In step S42, for example, based on the experimental condition table created by the calculation matrix creation part 144, the workpiece W is subjected to liquid processing, and the film thickness after the liquid processing is measured (estimated). The liquid processing conditions and film thickness measurement (estimation) method at this time are the same as those described in the above embodiment. That is, the workpiece W is subjected to liquid processing under the control of the liquid processing control part 114 based on the liquid processing conditions created by the calculation matrix creation part 144. In addition, the film thickness of the workpiece W after the liquid processing is estimated under the control of the film thickness estimation function 121. As a result, experimental results corresponding to the experimental table are obtained.

Next, the controller 100 executes step S43. In step S43, for example, an adjustment amount calculation matrix M and a correctability component calculation matrix N are calculated from the experimental design table prepared in step S41 and the film thickness measurement results (experimental results) obtained in step S42. When the film thickness distribution obtained from the experimental results is approximated by the Zernike polynomial in the same manner as described above, four coefficients corresponding to the respective experimental results are obtained. That is, a result matrix F of the number of experimental conditions (rows)×4 (columns) is obtained from the experimental results. On the other hand, as a condition table, a condition matrix P of the number of experimental conditions (rows)× adjustment knobs (columns) is obtained. The intercept of the condition matrix P can be removed by adding one column for absorbing the intercept and setting the number of experimental conditions (row)×(adjustment knob+1) (column).

The processes are performed so as to obtain the matrix product of the above condition matrix P and the transposed matrix of the condition matrix P, calculate the product $(P^T \cdot P)^{-1}$. P of the inverse matrix thereof and the condition matrix P, obtain the matrix of the product and the result matrix F, and slice the intercept. By performing the series of processes, it is possible to obtain a matrix specifying how much each knob contributes to each of the Zernike coefficients. This matrix corresponds to the correctability component calculation matrix N. Furthermore, the adjustment amount calculation matrix M is obtained by obtaining a pseudo-inverse matrix for the correctability component calculation matrix N. Through the above procedure, the adjustment amount calculation matrix M and the correctability component calculation matrix N are obtained.

In this way, when calculating the adjustment amount calculation matrix M and the correctability component calculation matrix N, it is necessary to prepare multiple experimental results in which the liquid processing conditions (knob settings) are associated with the liquid processing results (film thickness estimation results) under those conditions. Further, as described above, based on the result matrix F and the condition matrix P, the correctability component calculation matrix N and the adjustment amount calculation matrix M are obtained as matrices that can be associated with the result matrix F and the condition matrix P. Since the correctability component calculation matrix N and the adjustment amount calculation matrix M are changed according to the liquid processing conditions, they may be prepared each time when the conditions such as the type of target workpiece W, the type of the coating film AF coated on the workpiece W, the target film thickness of the coating film AF, and the like are changed.

[Regarding the Correction of the Adjustment Amount $\Delta P_{adj.}$]

By the above-described procedure, the adjusted knob $P_{next}$ can be calculated based on the knob adjustment amount $\Delta P_{adj.}$. When the correctability component $\Delta F_{adj.}$ is obtained, the expected film thickness $F_{XYnext}$, which is the film thickness after adjusting the knob, can be calculated from the correctability component $\Delta F_{adj.}$. Now, a method of calculating the knob adjustment amount $\Delta P_{adj.}$ under more optimal conditions is described. This procedure may be implemented as a modification of the above-described step S34 (see FIG. 10).

As described above, the knob adjustment amount $\Delta P_{adj.}$ may be described as a matrix product $\Delta F \cdot M$ of the correction target film thickness $\Delta F$ and the adjustment amount calculation matrix M. The adjustment amount calculation matrix M is a pseudo-inverse matrix of the correctability component calculation matrix N. That is, the adjustment amount calculation matrix M may be expressed as the matrix product of the transposed matrix of the correctability component calculation matrix N and the inverse matrix of the matrix product of the correctability component calculation matrix N and its transposed matrix. That is, the adjustment amount $\Delta P_{adj.}$ may be written as equation (3) below.

$$\Delta P_{adj.} = \Delta F \cdot N^T \cdot (N \cdot N^T)^{-1} \quad (3)$$

Figure 13:
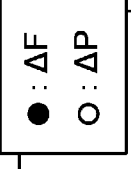

The above equation (3) is the same equation as the solution for specifying an approximate straight line using an unweighted least squares method of discrete data. As described above, the coefficients of the terms Z1, Z4, Z9 and Z16 in the Zernike polynomial are calculated by the approximation using the least squares method. (a) of FIG. 13 schematically shows an image of the coefficient approximation using the least squares method. Here, the approximation of three coefficients (Z4, Z9 and Z16 in the above embodiment) as coefficients related to concentric curvature components is schematically shown. As shown in (a) of FIG. 13, the approximation of coefficients using the least squares method means that $\Delta P$ is adjusted so that the target value of the correction target film thickness $\Delta F$ and the adjusted film thickness when applying the knob adjustment amount $\Delta P_{adj.}$ (described as $\Delta P$ here) are small. At this time, $\Delta P_{adj.}$ is obtained so that the sum of squared residuals of the coefficients of each term is small.

However, in the approximation using the least squares method shown in equation (3), the respective coefficients are treated equally. Therefore, as shown in (a) of FIG. 13, the value that minimizes the sum of squares is obtained without any consideration on the relationship between the respective terms (Z4, Z9 and Z16). However, in practice, when approximating the film thickness distribution of the target film using the Zernike polynomial, among the coefficients of the respective terms, the component described with a lower order has a higher degree of importance in approximation than the component described with a higher order. This is related to the variance of the basic functions of the respective terms in the Zernike polynomial (the above-mentioned equation in which each term is described by the radius r and θ of the workpiece W) with respect to infinite points. The basic functions for the respective terms have different variances due to different descriptions in using the order of the radius r or θ. Therefore, by setting the coefficient of each term so that the residual difference from the correction target film thickness $\Delta F$ in the component with larger variance, i.e., the component described by a lower order, becomes smaller, it is possible to reduce the variance with respect to the target value of the correction target film thickness $\Delta F$ in the entire approximation expression. As a result, the in-plane uniformity of the film thickness after correction using the adjustment amount $\Delta P_{adj.}$ is optimized.

Therefore, in the approximation using the least squares method, it is conceivable to adjust the sum of squares of the residual of each term according to the degree of importance by weighting the coefficient of each term according to the degree of importance. Specifically, by applying a weighting matrix W to equation (3), equation (3) is changed to equation (4) below.

$$\Delta P_{adj.} = \Delta F \cdot W \cdot N^T \cdot (N \cdot W \cdot N^T)^{-1} \quad (4)$$

As shown in (b) of FIG. 13, the weighting matrix W may be expressed as the following equation (5) using coefficients W1, W2 and W3.

$$W = \begin{pmatrix} W_1 & 0 & 0 \\ 0 & W_2 & 0 \\ 0 & 0 & W_3 \end{pmatrix} \quad (5)$$

By inputting a number indicating the weight of each of the terms (Z4, Z9 and Z16) for each of the coefficients W1, W2 and W3, which are the components in the matrix, the above equation (4) becomes an equation corresponding to the solution method of the weighting least squares method. Therefore, by solving the equation (4), the adjustment amount $\Delta P_{adj.}$ can be calculated under consideration of the weight. As described above, it is assumed that the coefficients are set to satisfy the relationship of W1>W2>W3 in consideration of the fact that the component described with a lower order has a higher degree of importance in approximation than the component described with a higher order. In this case, as shown in (b) of FIG. 13, $\Delta P_{adj.}$ is obtained so that the sum of squares of these becomes smaller, under the assumption that the residual in Z4 is the smallest and the residual grows larger in the order of Z9 and Z16. As an example, if values corresponding to the variances of the basic functions of the respective terms are set as the coefficients W1, W2 and W3 related to the weights of the respective terms Z4, Z9 and Z16, they become values that considered the variances of the basic functions of the respective terms the most. Accordingly, a further optimization is possible. The values corresponding to the variances of the basic functions are, for example, ⅓, ⅕ and ⅐ for Z4, Z9 and Z16, respectively.

As described above, when the coefficients of the respective terms (here, Z4, Z9 and Z16) in the Zernike polynomial are obtained by the approximation using the least squares method, it is possible to obtain more appropriate approximation results that reflect the characteristics of the respective terms by performing calculation after weighting is set in consideration of the degrees of importance of the respective terms.

If the approximation using the weighting matrix W is performed to calculate the adjustment amount $\Delta P_{adj.}$, the variance of the correctability component $\Delta F_{adj.}$ in the Zernike space due to the adjustment of the knob can be calculated as shown in equation (6) below. That is, the variance of the correctability component can be described as follows by using the adjustment amount $\Delta P_{adj.}$, the adjustment amount calculation matrix M, and the weighting matrix W.

$$\text{Variance of Correctability Component [nm}^2\text{]} = (\Delta P_{adj.} \cdot N) \cdot W \cdot (\Delta P_{adj.} \cdot N)^T \quad (6)$$

The variance of the correctability component $\Delta F_{adj.}$ calculated by the equation (6) above is used to determine, for example, whether or not to perform correction using the adjustment amount $\Delta P_{adj.}$. For example, a threshold value is set in advance. If the calculated correctability component $\Delta F_{adj.}$ is smaller than the threshold value, it may be determined that the correction using the adjustment amount $\Delta P_{adj.}$ is not performed. Such evaluation using the variance of the correctability component $\Delta F_{adj.}$ may be performed, for example, after performing step S35 (see FIG. 10) described above.

[Regarding Screening of Abnormal Data]

Next, screening of data used when approximating the film thickness distribution with the Zernike polynomial in the above-described procedure will be described. In the above procedure, in step S31, the film thickness estimation result acquisition part 136 acquires the film thickness estimation result (measurement result) related to the workpiece W. In step S32, the polynomial approximation part 138 uses this result to derive the coefficients Z1, Z4, Z9 and Z16 of the respective terms by approximating the film thickness estimation result for the workpiece W acquired by the film thickness estimation result acquisition part 136 with the Zernike polynomial. However, in the above description, it is assumed that all the film thickness measurement results obtained in step S31 are used. Therefore, for example, even if an abnormal value is included in the film thickness measurement result, removing the data indicating the abnormal value is not assumed.

Figure 14:
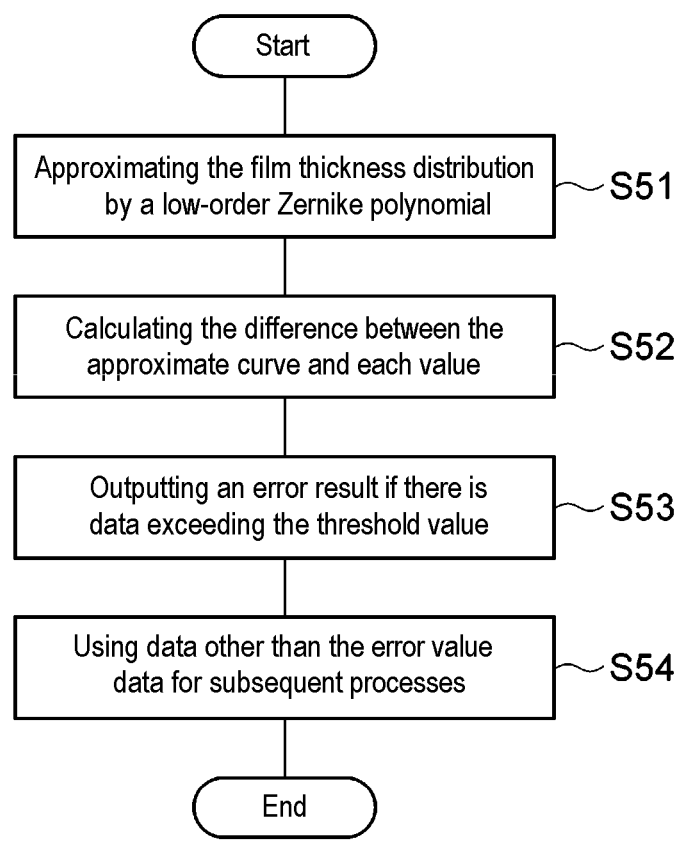
FIG. 14 is a flow chart showing an example of a method of detecting an abnormal value.

Therefore, before performing the approximation using the Zernike polynomial, a process of removing data including an abnormal value from the film thickness measurement results acquired in step S31 may be performed. A procedure for removing film thickness values determined to be an abnormal value from the film thickness measurement results will be described below with reference to FIG. 14. This procedure may be performed after performing step S31 (see FIG. 10) described above.

First, the controller 100 executes step S51. In step S51, for example, the polynomial approximation part 138 of the controller 100 approximates the measurement result (estimation result) of the film thickness of the workpiece W acquired by the film thickness estimation result acquisition part 136 with the Zernike polynomial, thereby deriving a coefficient of each term. In this way, the Zernike polynomial is also used in removing the abnormal value. However, in this step, only terms whose basic functions are described with lower orders than the terms of the Zernike polynomial used in step S32 are used. That is, a low-order Zernike polynomial containing only lower-order terms are used to approximate the film thickness measurements. As an example, if the coefficients of the Zernike polynomial used in step S32 are Z1, Z4, Z9 and Z16, in step S41, three coefficients Z1, Z4 and Z9 excluding Z16 may be calculated in the approximation using the low-order Zernike polynomial, thereby creating an approximate expression. Since this approximate expression is based on the low-order Zernike polynomial, it is called a low-order approximate expression. In this way, by performing the approximation using only the low-order terms in the Zernike polynomial to create the low-order approximate expression, it is possible to create a simple approximation curve using all the data.

Next, the controller 100 executes step S52. In step S52, for example, the polynomial approximation part 138 of the controller 100 calculates a difference (e.g., its absolute value) between the approximation curve based on the approximate expression that reflects the coefficients calculated in step S51 and the numerical value of the film thickness measurement result at each point, which is used to create the approximation curve. More precisely, a difference between the film thickness values at points corresponding to a plurality of measurement points in the low-order approximate expression and the actual film thickness values at the plurality of measurement points is calculated. As a result, the degree of divergence between the measured value (estimated value) of the film thickness at each point and the approximation curve is obtained.

Next, the controller 100 executes step S53. In step S53, for example, the polynomial approximation part 138 of the controller 100 determines whether the difference between the film thickness value corresponding to the measurement point on the approximation curve in step S52 and the film thickness value of the film thickness measurement result at each point exceeds a preset threshold value. If there is a numerical value of the measurement result that exceeds the threshold value, the polynomial approximation part 138 determines that the film thickness value at that point is an abnormal value, and outputs an error result. The threshold value is a value set to specify an abnormal value at a point determined to be reasonably spaced apart from the approximation curve. For example, 3% for the median value (film thickness value) of each point included in the approximation curve may be set as the threshold value of the difference. The threshold value is not limited to the value calculated based on the median value of the approximation curve. A value different from the value calculated from the approximation curve may be used.

The error result is a notification indicating that there is a point (measurement result) where a difference exceeds a threshold value, and includes information specifying the point (measurement result) where the difference exceeds the threshold value. The controller 100 may be configured to notify, for example, an operator of the coating developing apparatus 2 or the like that an error result is included, when an error result is outputted from the polynomial approximation part 138. Further, when an error result is outputted from the polynomial approximation part 138, the controller 100 may perform processing such as stopping the processes related to the workpiece W which is the target substrate, and stopping the processes related to the workpiece W after that workpiece W. How the controller 100 operates when an error result is outputted may be set in advance by, for example, an administrator of the coating developing apparatus 2 or the like.

Next, the controller 100 executes step S54. In step S54, for example, the controller 100 performs a subsequent process by using the film thickness values other than the abnormal value determined to be an error, i.e., the measurement result (film thickness value) at the point where the difference exceeds the threshold value. As an example, if there is an error as a result of determination of presence or absence of an error in the above step S53, the polynomial approximation part 138 may perform a process of step S32 by using the measurement result (film thickness value) other than the point (measurement result) where the difference exceeds the threshold value. As a result, the approximation of the film thickness distribution in step S32 does not include information about the point (measurement result) where the difference exceeds the threshold value. Further, in the subsequent process, i.e., in the process after step S33, calculation is performed by using the coefficients of the respective terms in the Zernike polynomial calculated under the condition that the information related to the point (measurement result) where the difference exceeds the threshold value is not included. If there is an abnormal value determined to be an error, the controller 100 may stop the operation of the coating developing apparatus 2 without performing subsequent processes. Thus, step S54 is an optional process.

As described above, before executing step S32 of approximating the film thickness distribution by the Zernike polynomial (calculating the coefficients of the respective terms), approximation is performed using only the lower-order terms in the Zernike polynomial, and the process of specifying an abnormal value is performed using the result. In this case, the abnormal value is prevented from being used in subsequent approximations that make use of the Zernike polynomial. Therefore, the approximate expression becomes more appropriate, and the tendency of the film thickness distribution on the substrate can be estimated more appropriately. Further, when the measurement result includes an abnormal value, it is possible to take measures such as stopping the coating developing apparatus 2 in consideration of the possibility that a certain abnormality has occurred in the coating developing apparatus 2. Therefore, the in-plane film thickness distribution of the workpiece W can be appropriately adjusted to a desired state.

[Action]

According to the film thickness analysis method and the film thickness analysis device described above, the approximate expression related to the film thickness distribution of the coating film AF is obtained by approximating the film thickness values at a plurality of measurement points obtained for the coating film AF, which is a target film, with respect to one Zernike polynomial. In this regard, the approximate expression is created by specifying a coefficient related to the film thickness of the entire workpiece W, which is a target substrate, and one or more coefficients related to the concentric curvature component, among the plurality of coefficients included in the Zernike polynomial. As a result, an approximate expression that appropriately reflects the characteristics of the coating film AF formed while rotating the workpiece FW is obtained. Moreover, by creating an approximate expression by this method, the film thickness distribution of the coating film based on the measurement results at many measurement points can be described by one approximate expression. Accordingly, it is possible to more appropriately estimate the tendency of the film thickness distribution on the substrate.

When the coating film AF is formed on the workpiece W, it is important from the viewpoint of process control to appropriately determine the film thickness distribution. However, since it is not easy to measure the thickness of the film formed on the workpiece W, process control was often indirectly performed using, for example, the processing conditions when forming a processing film. However, since the film thickness of the coating film AF also affects the performance of the product obtained from the workpiece W, it is required to grasp the film thickness more accurately. On the other hand, by using the above method, it becomes possible to describe the film thickness distribution of the coating film AF on the surface of the workpiece W by an approximate expression. At this time, considering that the processing liquid is supplied to form the coating film AF while rotating the workpiece W, one or more coefficients related to the concentric curvature component from the Zernike polynomial are used. With such a configuration, it is possible to obtain an approximate expression that more appropriately grasps the tendency of the film thickness distribution while using fewer coefficients.

In addition, as described above, in the Zernike polynomial, the concentric curvature components are defined in advance. Therefore, it is possible to specify which component of the Zernike polynomial is closely related to the measured value at each point on the substrate. Therefore, as described in the above embodiment, the approximate expression can be created easily and properly by creating an approximate expression using a coefficient matrix, which is a matrix specifying the relationship between the respective measurement points and the plurality of coefficients included in the Zernike polynomial.

The approximate expression may include four types of terms of 0th, 2nd, 4th, and 6th orders related to the diameter (r) of the workpiece W. The Zernike polynomial may also include higher-order terms as components that are described using the diameter of the target substrate. By adopting the configuration for creating the approximate expression so as to include the four types of terms of 0th, 2nd, 4th, and 6th orders (selecting the coefficients to be used from the Zernike polynomial), it is possible to prevent the coefficients used in the approximate expression from becoming complicated. Further, by adopting the configuration in which the approximate expression includes the above four types of terms, it is possible to prevent over-learning in approximating the film thickness distribution as compared with a case where the approximate expression includes higher-order terms.

Further, in the above-described embodiment, the current conditions of the adjustment knob related to the liquid processing conditions at the time of forming the coating film AF on the workpiece W are acquired. Moreover, the adjustment amount calculation matrix M, which is a calculation matrix that associates the adjustment amounts of the set values included in the liquid processing conditions with the change amounts of the plurality of coefficients included in the created approximate expression, is applied to the coefficient matrix obtained from the approximate expression. As a result, it becomes possible to calculate the adjustment amount of the set value when bringing the film thickness distribution of the workpiece W closer to the target value. By adopting the configuration in which the adjustment amount of the set value in the processing conditions is calculated using the approximate expression related to the film thickness distribution, the adjustment amount of the set value suitable for overall adjustment of the film thickness distribution on the target substrate can be calculated with a simpler calculation.

The liquid processing conditions may include a plurality of set values for mutually independent processes. It is considered that when the plurality of set values in the liquid processing conditions to be adjusted are the set values in mutually independent processes, it is possible to calculate the adjustment amount while excluding relationships between different set values in the same process. Therefore, it is possible to accurately calculate the adjustment amount of the set value for bringing the film thickness distribution closer to the target value.

In addition, the liquid processing conditions may include set values related to three types of liquid processing conditions, and three coefficients (Z4, Z9, and Z16 in the above embodiment) may be used as coefficients related to concentric curvature components. When there are three types of set values related to liquid processing, and the same number of three coefficients are used as coefficients related to the concentric curvature components in the approximate expression, the adjustment amount related to the adjustment of the film thickness distribution in three types of set values can be calculated appropriately. If the coefficients of concentric curvature component are fewer than the types of set values, there is a possibility that the set value may not be calculated appropriately.

Furthermore, the one or more coefficients related to the concentric curvature components in the approximate expression may be coefficients corresponding to terms of multiple types of orders related to the diameter of the target substrate in the Zernike polynomial. At this time, in calculating the adjustment amount of the set value, the adjustment amount calculation matrix M may be applied to the coefficient matrix obtained from the approximate expression after weighting the coefficient of each term in the Zernike polynomial. In the above example, the weighting matrix W is used to weight three coefficients (Z4, Z9 and Z16 in the above embodiment). With such a configuration, for example, the adjustment amount can be calculated in consideration of the degree of importance of the coefficients in the Zernike polynomial. Accordingly, it is possible to calculate the adjustment amount in consideration of the characteristics such as the degree of importance of the terms of multiple types of orders in the Zernike polynomial, so that the adjustment amount can be calculated more appropriately.

Further, the weighting may be set such that, among the terms of multiple types of orders, the terms with lower orders are weighted more heavily than the terms with higher orders. In the above embodiment, the weighting coefficients W1, W2, and W3 corresponding to the three coefficients are set so as to satisfy the relationship of W1>W2>W3. With the above configuration, a term with a low order in the Zernike polynomial, which may have a high degree of importance, is generally weighted more heavily than a term with a high order. Therefore, it is possible to calculate a more appropriate adjustment amount.

The weighting may be performed based on the variance of basic functions of each of the terms of multiple types of orders related to the diameter of the target substrate. In this case, the conditions for calculating the adjustment amount can be adjusted based on the variance of the basic functions. Therefore, it is possible to calculate a more appropriate adjustment amount.

The one or more coefficients related to the concentric curvature components in the approximate expression may be coefficients corresponding to the terms of multiple types of orders related to the diameter of the target substrate in the Zernike polynomial, i.e., Z4, Z9, and Z16 in the above embodiment. In addition, before creating the approximate expression, a low-order approximate expression may be created by using a low-order Zernike polynomial that includes only terms having lower orders than those of the Zernike polynomial used in creating the approximate expression. Furthermore, based on the difference between the film thickness values at the points corresponding to the plurality of measurement points included in the low-order approximate expression and the film thickness values at the plurality of measurement points, determination may be made as to whether each of the film thickness values is an abnormal value. In this case, since the low-order approximate expression is created by using the low-order Zernike polynomial, it is possible to create a simple approximate expression. Then, for example, a film thickness value with a large divergence between the low-order approximate expression and the film thickness value can be determined to be an abnormal value. Therefore, when the film thickness values measured at a plurality of measurement points include an abnormal value, it is possible to appropriately specify the abnormal value.

When creating the approximate expression, by approximating a film thickness value different from the film thickness value determined to be an abnormal value among the film thickness values measured at a plurality of measurement points with respect to the Zernike polynomial, it may also be possible to create an approximate expression related to the film thickness distribution of the target film. In this case, since it is possible to create an approximate expression without using the film thickness value determined to be an abnormal value, it is possible to create an approximate expression that more accurately reflects the actual film thickness of the target film.

Modifications

While various exemplary embodiments have been described above, various omissions, substitutions, and modifications may be made without being limited to the exemplary embodiments described above. In addition, elements of different embodiments can be combined to provide other embodiments.

For example, the method of measuring the film thickness of the coating film AF on the workpiece W is not limited to the method described in the above embodiments. Although the film thickness is measured by emitting the laser light in the above embodiments, the film thickness analysis method of the above-described embodiments may be applied to another method as long as it can obtain the measured value (estimated value) of the film thickness of the coating film AF formed on the workpiece W. Therefore, it may be possible to acquire film thickness information at a plurality of measurement points on the workpiece W using a known film thickness measurement method or the like. The method is not particularly limited.

Even when the film thickness measurement method described in the above embodiment is used, the arrangement, configuration, and the like of each part may be changed as appropriate.

In the above-described example, the thickness of the coating film AF of the processing liquid (resist) for forming the resist film is estimated. In contrast, the film thickness analysis method described in the above embodiment may estimate the thickness of a coating film of a processing liquid for forming a film (e.g., a lower layer film or an upper layer film) other than the resist film. In addition, the film thickness analysis method may also be applied to a developing liquid for developing a resist film.

The method of deriving the calculation matrices M and N, the method of calculating the coefficient matrix Z, and the like described in the above embodiments are merely examples, and may be changed as appropriate depending on the liquid processing conditions and the like.

From the foregoing description, it will be appreciated that various embodiments of the present disclosure have been set forth herein for purposes of illustration, and various changes may be made without departing from the scope and spirit of the present disclosure. Therefore, the various embodiments disclosed herein are not intended to be limitative. The true scope and spirit are defined by the appended claims.

EXPLANATION OF REFERENCE NUMERALS

1: substrate processing system, 2: coating developing apparatus, 60: measurement part, 70A to 70C: light emitting/receiving device, 100: controller, 112: processing information storage part, 114: liquid processing control part, 120: film thickness adjustment part, 121: film thickness estimation function, 122: film thickness adjustment function, 124: light emission control part, 126: signal acquisition part, 128: feature quantity acquisition part, 130: model information storage part, 132: film thickness calculation part. 134: condition acquisition part, 136: film thickness estimation result acquisition part, 138: polynomial approximation part, 140: calculation matrix storage part. 142: film thickness adjustment condition calculation part. 144: calculation matrix creation part

What is claimed is:

1. A film thickness analysis method, comprising:
acquiring film thickness values at a plurality of measurement points different from each other along a radial direction for a target film formed on an analysis target substrate by supplying a processing liquid while rotating the target substrate based on predetermined liquid processing conditions;
creating an approximate expression related to a film thickness distribution of the target film by approximating the film thickness values at the plurality of measurement points with respect to one Zernike polynomial, to estimate an adjustment knob and an adjustment amount of the adjustment knob for correcting film thickness; and
adjusting the liquid processing conditions based on the adjustment knob and the adjustment amount to adjust the film thickness distribution of the target film,
wherein, in the creating the approximate expression, the approximate expression is created by specifying a coefficient related to the film thickness of the entire target substrate and one or more coefficients related to concentric curvature components, among a plurality of coefficients included in the Zernike polynomial.

2. The method of claim 1, wherein in approximating the film thickness values, the approximate expression is created using a coefficient matrix, which is a matrix specifying a relationship between each of the measurement points and the plurality of coefficients included in the Zernike polynomial.

3. The method of claim 1, wherein the approximate expression includes four types of terms of 0th, 2nd, 4th, and 6th orders regarding the diameter of the target substrate.

4. The method of claim 1, further comprising:
acquiring the liquid processing conditions when the target film is formed on the target substrate; and
calculating adjustment amounts of set values when bringing the film thickness distribution of the target film closer to a target value by applying an adjustment amount calculation matrix, which is a calculation matrix that associates the adjustment amounts of the set values included in the liquid processing conditions with change amounts of a plurality of coefficients included in the created approximate expression, to a coefficient matrix obtained from the approximate expression related to the film thickness distribution of the target film on the target substrate.

5. The method of claim 4, wherein the liquid processing conditions include a plurality of set values in mutually independent processes.

6. The method of claim 4, wherein the one or more coefficients related to the concentric curvature components in the approximate expression are coefficients corresponding to multiple types of terms related to the diameter of the target substrate in the Zernike polynomial, and
wherein, in calculating the adjustment amount of the set value, the adjustment amount calculation matrix is applied to the coefficient matrix obtained from the approximate expression after the coefficient of each term in the Zernike polynomial is subjected to weighting.

7. The method of claim 6, wherein the weighting is set such that among the terms of multiple types of orders, a term of a lower order has a greater weight than a term of a higher order.

8. The method of claim 7, wherein the weighting is set based on variance of a basic function of each of the terms of multiple types of orders related to the diameter of the target substrate.

9. The method of claim 1, wherein the one or more coefficients related to the concentric curvature components in the approximate expression are coefficients corresponding to terms of multiple types of orders related to the diameter of the target substrate in the Zernike polynomial, wherein the method further comprises:
before creating the approximate expression related to the film thickness distribution of the target film, creating a low-order approximate expression related to the film thickness distribution of the target film by approximating the film thickness values at the plurality of measurement points with respect to a low-order Zernike polynomial containing only terms related to the diameter of the target substrate whose orders are smaller than the orders in the Zernike polynomial used in creating the approximate expression, and determining whether or not each of the film thickness values at the plurality of measurement points is an abnormal value, based on a difference between the film thickness values at the points corresponding to the plurality of measurement points included in the low-order approximate expression and the film thickness values at the plurality of measurement points.

10. The method of claim 9, wherein in creating the approximate expression, the approximate expression related to the film thickness distribution of the target film is created by approximating a film thickness value different from the film thickness value determined to be the abnormal value among the film thickness values at the plurality of measurement points with respect to the Zernike polynomial.

11. A film thickness analysis device, comprising:
an acquisition part configured to acquire film thickness values at a plurality of measurement points different from each other along a radial direction for a target film formed on an analysis target substrate by supplying a processing liquid while rotating the target substrate based on predetermined liquid processing conditions; and
an approximate expression creation part configured by a control computer and configured to create an approximate expression related to a film thickness distribution of the target film by approximating the film thickness values at the plurality of measurement points with respect to one Zernike polynomial, to estimate an adjustment knob and an adjustment amount of the adjustment knob for correcting film thickness and to adjust the liquid processing conditions based on the adjustment knob and the adjustment amount to adjust the film thickness distribution of the target film, wherein the approximate expression creation part is configured to create the approximate expression by specifying a coefficient related to the film thickness of the entire target substrate and one or more coefficients related to concentric curvature components, among a plurality of coefficients included in the Zernike polynomial.

12. A computer-readable storage medium storing a program for causing a device to perform the film thickness analysis method of claim 1.

* * * * *